US010531270B2

(12) United States Patent
Takano

(10) Patent No.: US 10,531,270 B2
(45) Date of Patent: Jan. 7, 2020

(54) COMMUNICATION CONTROL DEVICE, COMMUNICATION CONTROL METHOD, TERMINAL DEVICE, AND INFORMATION PROCESSING DEVICE

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 111 days.

(21) Appl. No.: 14/895,262

(22) PCT Filed: Jul. 8, 2014

(86) PCT No.: PCT/JP2014/068230
§ 371 (c)(1),
(2) Date: Dec. 2, 2015

(87) PCT Pub. No.: WO2015/045556
PCT Pub. Date: Apr. 2, 2015

(65) Prior Publication Data
US 2016/0192171 A1    Jun. 30, 2016

(30) Foreign Application Priority Data
Jun. 26, 2013  (JP) .................. 2013-199371

(51) Int. Cl.
*H04W 8/00*  (2009.01)
*H04W 76/14*  (2018.01)
*H04W 72/04*  (2009.01)

(52) U.S. Cl.
CPC ....... *H04W 8/005* (2013.01); *H04W 72/0486* (2013.01); *H04W 76/14* (2018.02); *H04W 72/042* (2013.01)

(58) Field of Classification Search
CPC .......... H04W 72/042; H04W 72/0486; H04W 76/023; H04W 8/005
See application file for complete search history.

(56) References Cited

U.S. PATENT DOCUMENTS

2009/0016248 A1    1/2009  Li et al.
2009/0323647 A1   12/2009  Park et al.
(Continued)

FOREIGN PATENT DOCUMENTS

JP    2010-533428 A    10/2010
JP    2011-526473 A    10/2011
(Continued)

OTHER PUBLICATIONS

International Preliminary Report on Patentability dated Jan. 7, 2016 in PCT/JP2014/068230 (with English language translation).
(Continued)

*Primary Examiner* — Andrew Lai
*Assistant Examiner* — M Mostazir Rahman
(74) *Attorney, Agent, or Firm* — Xsensus, LLP

(57) ABSTRACT

A communication control device including an acquisition unit configured to acquire radio resource information indicating a radio resource, the radio resource being a unit time of cellular communication, for transmitting a discovery signal enabling another device to discover a device conducting device-to-device communication, and a control unit configured to control transmission of the radio resource information to a terminal device The control device makes it possible to moderate load for a device conducting device-to-device communication (D2D communication).

20 Claims, 24 Drawing Sheets

(56) References Cited

U.S. PATENT DOCUMENTS

| | | |
|---|---|---|
| 2011/0317586 A1 | 12/2011 | Palanki et al. |
| 2013/0016629 A1 | 1/2013 | Mallik et al. |
| 2013/0083779 A1 | 4/2013 | Ahn et al. |
| 2013/0225184 A1* | 8/2013 | Liu ..................... H04W 72/042 455/450 |
| 2014/0269641 A1* | 9/2014 | Jang ..................... H04L 5/0053 370/336 |
| 2015/0382252 A1* | 12/2015 | Yu ......................... H04W 8/005 370/331 |
| 2016/0014831 A1 | 1/2016 | Lee et al. |

FOREIGN PATENT DOCUMENTS

| | | |
|---|---|---|
| JP | 2013-534775 A | 9/2013 |
| JP | 2014/031829 A2 | 2/2014 |
| JP | 2014523205 A | 9/2014 |
| JP | 2014-225842 A | 12/2014 |
| WO | WO 2009/009355 A2 | 1/2009 |
| WO | WO 2009/158652 A1 | 12/2009 |
| WO | WO 2011/163088 A1 | 12/2011 |
| WO | WO 2013/009992 A2 | 1/2013 |
| WO | WO 2013/119094 A1 | 8/2013 |
| WO | WO 2014/124689 A1 * | 8/2014 |

OTHER PUBLICATIONS

Extended European Search Report dated Feb. 8, 2017 in Patent Application. No. 14847105.5.

"Design aspects for D2D discovery" ETRI, 3GPP TSG RAN WG1 Meeting #74, XP050716389, Aug. 19-23, 2013, pp. 1-3.

"D2D Discovery Design for Public Safety and General Scenarios" Intel Corporation, 3GPP TSG RAN WG1 Meeting #74, XP050716180, Aug. 19-23, 2013, pp. 1-6.

International Search Report dated Oct. 14, 2014 in PCT/JP2014/068230 (with partial English language translation).

"D2D Discovery in LTE" 3GPP TSG-RAN WG1 Meeting #73 R1-132187, May 2013, 6 Pages.

"$3^{rd}$ Generation Partnership Project; Technical Specification Group SA; Feasibility Study for Proximity Services (ProSe) (Release 12)" 3GPP TR 22.803 V0.2.0, Feb. 2012, 18 Pages.

"$3^{rd}$ Generation Partnership Project; Technical Specification Group Services and System Aspects; Feasibility study for Proximity Services (ProSe) (Release 12)" 3GPP TR 22.803 V12.1.0, Mar. 2013, 45 Pages.

Notification of Reason(s) for Refusal issued in Japanese Application 2015-538970 dated Aug. 7, 2018.

* cited by examiner

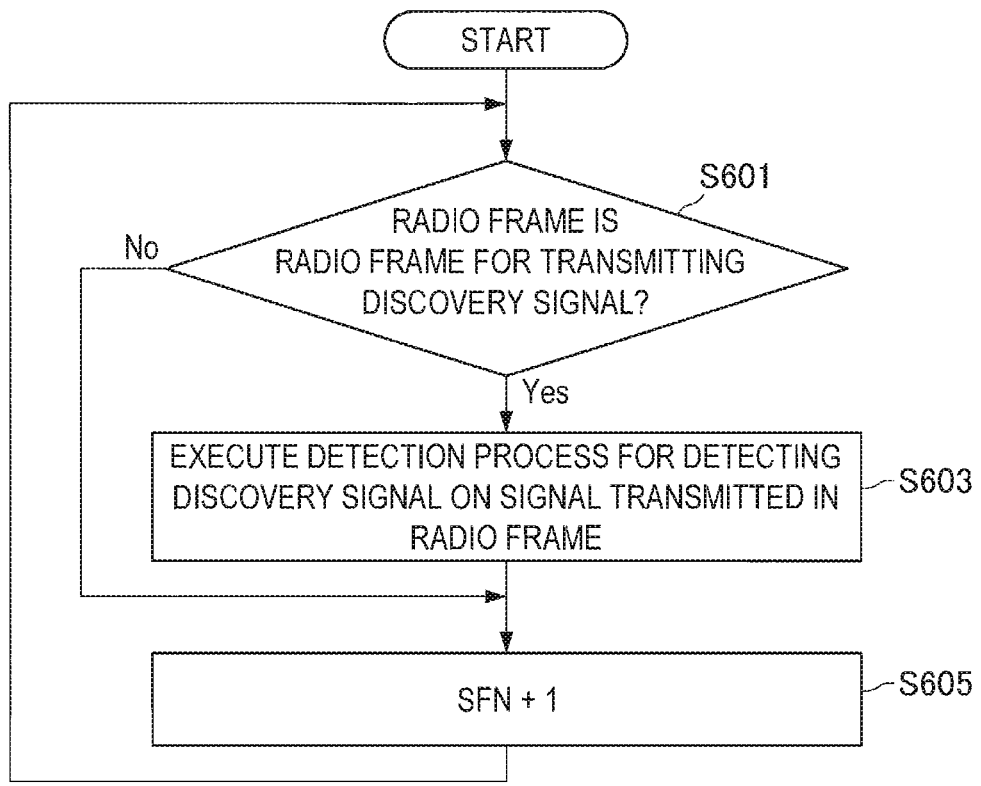

COMMUNICATION CONTROL DEVICE, COMMUNICATION CONTROL METHOD, TERMINAL DEVICE, AND INFORMATION PROCESSING DEVICE

TECHNICAL FIELD

The present disclosure relates to a communication control device, a communication control method, a terminal device, and an information processing device.

BACKGROUND ART

Device-to-device communication (D2D communication) is communication in which two or more terminal devices transmit and receive signals directly, unlike typical cellular communication in which a base station and a terminal device transmit and receive signals. For this reason, it is anticipated that D2D communication will be used to create new usage scenarios for terminal devices that differ from the typical cellular communication above. For example, various applications are conceivable, such as information sharing by data communication between nearby terminal devices or among a group of nearby terminal devices, distribution of information from an installed terminal device, and autonomous communication between machines, called machine-to-machine (M2M) communication.

Additionally, it is conceivable that D2D communication will be put to effective use in data offloading in response to the significant increase in data traffic due to the recent increase in smartphones. For example, in recent years, there has been a sharp rise in the need to transmit and receive video image streaming data. However, since video images typically have large data sizes, there is a problem of consuming many resources on a radio access network (RAN). Consequently, if terminal devices are in a state suitable for D2D communication with each other, such as when the terminal devices are a short distance away from each other, video image data may be offloaded to D2D communication, thereby moderating the resource consumption and processing load on a RAN. In this way, D2D communication provides value to both telecommunications carriers and users. For this reason, D2D communication is currently recognized as one crucial technology area for Long Term Evolution (LTE), and is receiving attention from the 3rd Generation Partnership Project (3GPP) standards committee.

For example, Non-Patent Literature 1 discloses use cases for D2D communication.

CITATION LIST

Non-Patent Literature

Non-Patent Literature 1: 3GPP TR 22.803, "3rd Generation Partnership Project; Technical Specification Group Services and System Aspects; Feasibility study for Proximity Services (ProSe)"

SUMMARY OF INVENTION

Technical Problem

However, for example, even if a discovery signal enabling another device to discover a device conducting D2D communication is transmitted by a terminal device conducting D2D communication, the other terminal device conducting D2D communication does not know the timing at which the discovery signal was transmitted, or if the discovery signal is receivable. For this reason, for example, the terminal device transmits the discovery signal at a high frequency of repetition, and the other terminal device conducts a detection process for detecting the discovery signal at a high frequency of repetition. As a result, the load on that other terminal device may increase.

Accordingly, it is desirable to provide a mechanism that enables a moderation of the load for a device conducting device-to-device communication (D2D communication).

Solution to Problem

According to the present disclosure, there is provided a communication control device including: an acquisition unit configured to acquire radio frame information indicating a radio frame, the radio frame being a unit time of cellular communication, for transmitting a discovery signal enabling another device to discover a device conducting device-to-device communication; and a control unit configured to control transmission of the radio frame information to a terminal device.

According to the present disclosure, there is provided a communication control method including: acquiring radio frame information indicating a radio frame, the radio frame being a unit time of cellular communication, for transmitting a discovery signal enabling another device to discover a device conducting device-to-device communication; and controlling, with a processor, transmission of the radio frame information to a terminal device.

According to the present disclosure, there is provided a terminal device including: an acquisition unit configured to acquire radio frame information indicating a radio frame, the radio frame being a unit time of cellular communication, for transmitting a discovery signal enabling another device to discover a device conducting device-to-device communication; and a control unit configured to control transmission of the discovery signal based on the radio frame information.

According to the present disclosure, there is provided an information processing device including: memory configured to store a program; and one or more processors able to execute the program. The program causes the execution of acquiring radio frame information indicating a radio frame, the radio frame being a unit time of cellular communication, for transmitting a discovery signal enabling another device to discover a device conducting device-to-device communication, and controlling transmission of the discovery signal based on the radio frame information.

According to the present disclosure, there is provided a terminal device including: an acquisition unit configured to acquire radio frame information indicating a radio frame, the radio frame being a unit time of cellular communication, for transmitting a discovery signal enabling another device to discover a device conducting device-to-device communication; and a control unit configured to control a detection process for detecting the discovery signal based on the radio frame information.

According to the present disclosure, there is provided an information processing device including: memory configured to store a program; and one or more processors able to execute the program. The program causes the execution of acquiring radio frame information indicating a radio frame, the radio frame being a unit time of cellular communication, for transmitting a discovery signal enabling another device to discover a device conducting device-to-device communication, and controlling a detection process for detecting the discovery signal based on the radio frame information.

Advantageous Effects of Invention

According to the present disclosure as described above, it becomes possible to moderate the load for a device conducting device-to-device communication (D2D communication). Note that the above advantageous effect is not strictly limiting, and that any advantageous effect indicated in the present disclosure or another advantageous effect that may be reasoned from the present disclosure may also be exhibited in addition to, or instead of, the above advantageous effect.

BRIEF DESCRIPTION OF DRAWINGS

FIG. 8 is a flowchart illustrating an example of a schematic flow of a second communication control process on the terminal device side according to an embodiment of the present disclosure.

FIG. 9 is an explanatory diagram for illustrating an example of correspondence relationships between radio frames and meanings.

DESCRIPTION OF EMBODIMENTS

Figure 1:
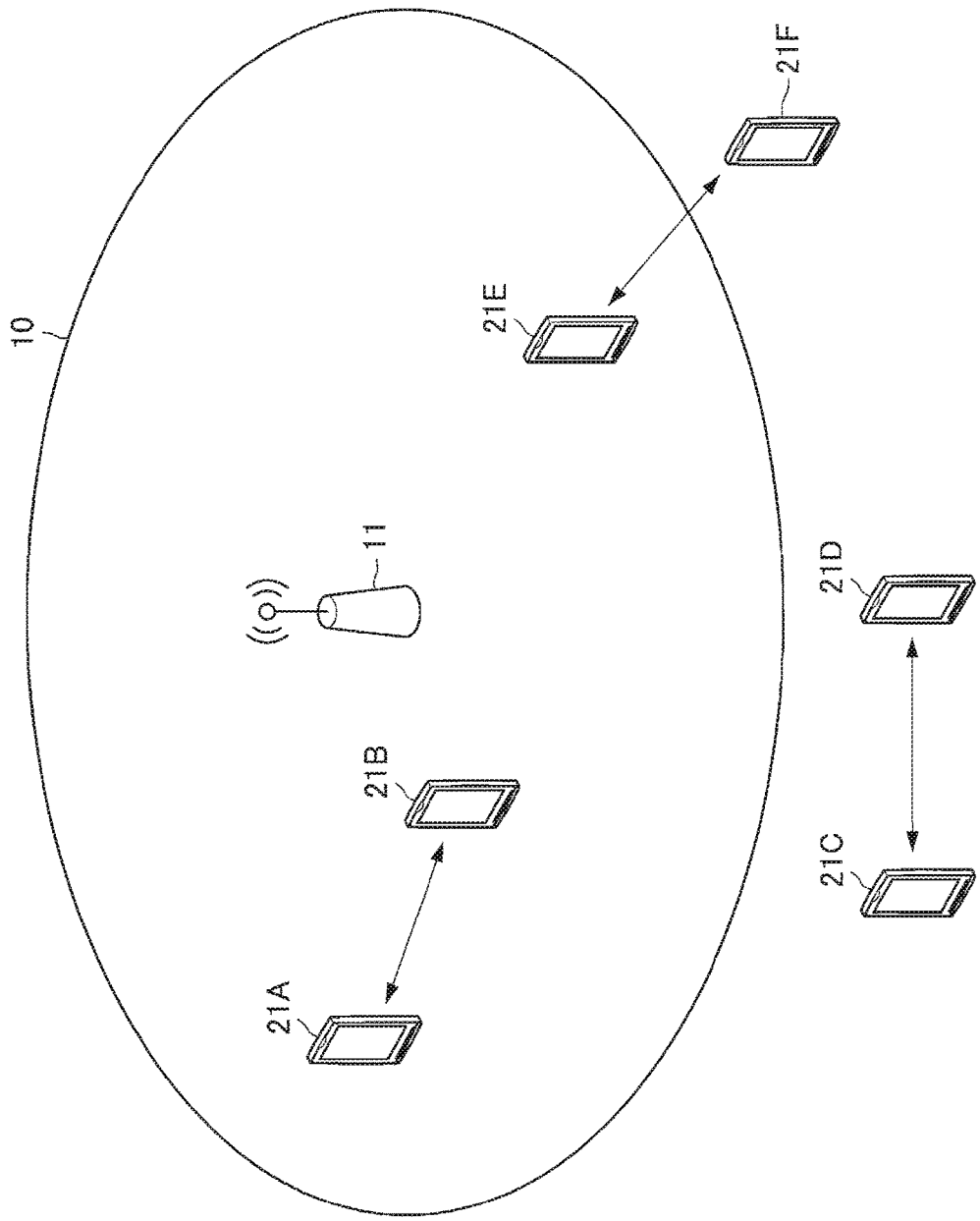
FIG. 1 is an explanatory diagram for illustrating an example of D2D communication.

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

Hereinafter, the description will proceed in the following order.

1. Introduction
2. Schematic configuration of communication system
3. Configuration of respective communication nodes
   3.1. Base station configuration
   3.2. Terminal device configuration
4. Process flow
5. Modifications
   5.1. First modification
   5.2. Second modification
   5.3. Third modification
   5.4. Fourth modification
   5.5. Fifth modification 6. Applications
6.1. Applications related to base station
6.2. Applications related to terminal device
7. Conclusion <<1. Introduction>>

First, technology and considerations related to D2D communication will be described with reference to FIG. 1.

(D2D Communication Use Cases)

Use cases for D2D communication have been argued in groups such as the Service and System Aspects (SA) 1 of the 3GPP, and are described in TR 22.803. Note that although TR 22.803 discloses use cases, specific configurations or methods of realizing such use cases are not disclosed.

Uses of D2D Communication

In an ordinary LTE system, a base station and a terminal device wirelessly communicate, but terminal devices do not wirelessly communicate with each other. However, there is demand for techniques enabling terminal devices to wirelessly communicate with each other directly for public safety uses or other general uses.

Public safety uses may include anti-collision warnings and disaster warnings, for example. Since most public safety uses are expected to relate to emergency situations, response time in D2D communication is considered to be important.

Meanwhile, other general uses include data offloading, for example. With data offloading by D2D communication, it becomes possible to reduce the load on a cellular communication network.

Coverage

D2D communication may be conducted inside the coverage of a base station, and may also be conducted outside the coverage of a base station. Alternatively, if one terminal device is positioned inside the coverage of a base station while another terminal device is positioned outside that coverage, D2D communication may be conducted by these terminal devices. Hereinafter, a specific example of a use case will be described with reference to FIG. 1.

FIG. 1 is an explanatory diagram for illustrating an example of D2D communication. Referring to FIG. 1, a base station 11 and multiple terminal devices 21 (that is, terminal devices 21A to 21F) are illustrated. As a first example of D2D communication, a terminal device 21A and a terminal device 21B positioned inside a cell 10 formed by the base station 11 (that is, the coverage of the base station 11) conduct D2D communication. Such D2D communication is called in-coverage D2D communication. As a second example of D2D communication, a terminal device 21C and a terminal device 21D positioned outside the cell 10 conduct D2D communication. Such D2D communication is called out-of-coverage D2D communication. As a third example of D2D communication, a terminal device 21E positioned inside the cell 10 and a terminal device 21F positioned outside the cell 10 conduct D2D communication. Such D2D communication is called partial-coverage D2D communication. From the perspective of public safety, out-of-coverage D2D communication and partial-coverage D2D communication are also important.

(Flow Up to D2D Communication)

For example, synchronization, discovery, and connection establishment are conducted in order, and after that, D2D communication is conducted.

Synchronization

When two terminal devices are positioned inside the coverage of a base station (that is, a cell formed by a base station), the two terminal devices are able to synchronize with other to a degree by acquiring synchronization with the base station using downlink signals from the base station.

On the other hand, if at least one of the two terminal devices attempting to conduct D2D communication is positioned outside the coverage of the base station (that is, a cell formed by a base station), at least one of the two terminal devices transmits a synchronization signal for synchronization in D2D communication, for example.

Discovery

Discovery is a process by which a terminal device identifies the presence of another terminal device nearby. In other words, discovery may also called a process by which a terminal device discovers another terminal device, or by which a terminal device is discovered by another terminal device.

Discovery is conducted by, for example, transmitting and receiving a discovery signal that enables another device to discover a device conducting D2D communication. More specifically, one of two terminal devices transmits a discovery signal, and the other of the two terminal devices receives that discovery signal, for example. The other terminal device then attempts to communicate with the terminal device.

Note that a discovery signal is appropriately detected by having the two terminal devices attempting to conduct D2D communication synchronize in advance before transmitting or receiving the discovery signal.

(Discovery Signal)

When two terminal devices attempting to conduct D2D communication are positioned inside the coverage of a base station, it is demanded that the discovery signals transmitted by the above two terminal devices not collide with signals transmitted and received between the base station and the terminal devices. For this reason, for example, one of the two devices attempting to conduct D2D communication may transmit a discovery signal according to control by the base station.

On the other hand, when two terminal devices attempting to conduct D2D communication are positioned outside the coverage of a base station, it is desirable that the discovery signals are transmitted according to a contention-based method. From the perspective of unified design, it is desirable that a contention-based method is implemented in both the in-coverage D2D communication and the out-of-coverage D2D communication. Obviously, however, separate methods may also be implemented in each of in-coverage D2D communication and out-of-coverage D2D communication.

A contention-based method means a method designed while presupposing signal collisions, like in random access, for example. With a contention-based method, each terminal device transmits a signal on its own judgment. A method in which the transmission of a signal by a terminal device is controlled by any control station is not a contention-based method.

(Radio Resources for D2D Communication)

When D2D communication is conducted inside the coverage of a base station, interfering with the radio communication between the base station and a terminal device is not allowed. Accordingly, it is conceivable to use the frame format for radio communication between the base station and a terminal device as the frame format for D2D communication. For example, radio frames and subframes are used as units of time in D2D communication. A radio frame has a length of 10 ms, while a subframe has a length of 1 ms. As an example, a specific subframe inside a radio frame is released as radio resources for D2D communication. If the base station announces such radio resources for D2D communication to the terminal devices, the interference of D2D communication on the radio communication between the base station and a terminal device may be avoided. Note that a resource block is used as the unit of radio resources in D2D communication, for example. Such a resource block is a radio resource extending over 12 subcarriers in the frequency direction, and over 7 OFDM symbols in the time direction.

On the other hand, when D2D communication is conducted outside the coverage of a base station, the likelihood of D2D communication interfering with the radio communication between the base station and a terminal device may be considered to be low. However, since different instances of D2D communication may be conducted within a narrow region, it is desirable to account for interference between different instances of D2D communication. For example, a contention-based method may be used. Specifically, for example, signal retransmission may be conducted when a signal is not transmitted or received appropriately due to collision.

As discussed above, when the frame format for radio communication between the base station and a terminal device is also used for D2D communication, it is conceivable that the radio resources in any of the subframes among the uplink radio resources will be used for D2D communication. This is because on the uplink, if no radio resources are allocated to a terminal device in a subframe, no signals are transmitted in the subframe. On the other hand, on the downlink, even if no radio resources are allocated to any terminal devices, a reference signal is still transmitted on all of the subframes. For this reason, on the downlink, a D2D communication signal and a reference signal may collide.

(Discovery-Related Load)

The discovery-related load on a terminal device includes the load of transmitting a discovery signal, and the load of a process for detecting a discovery signal. Herein, the term load may encompass factors such as load from the perspective of power consumption, and load from the perspective of processing complexity.

<<2. Schematic Configuration of Communication System>>

Figure 2:
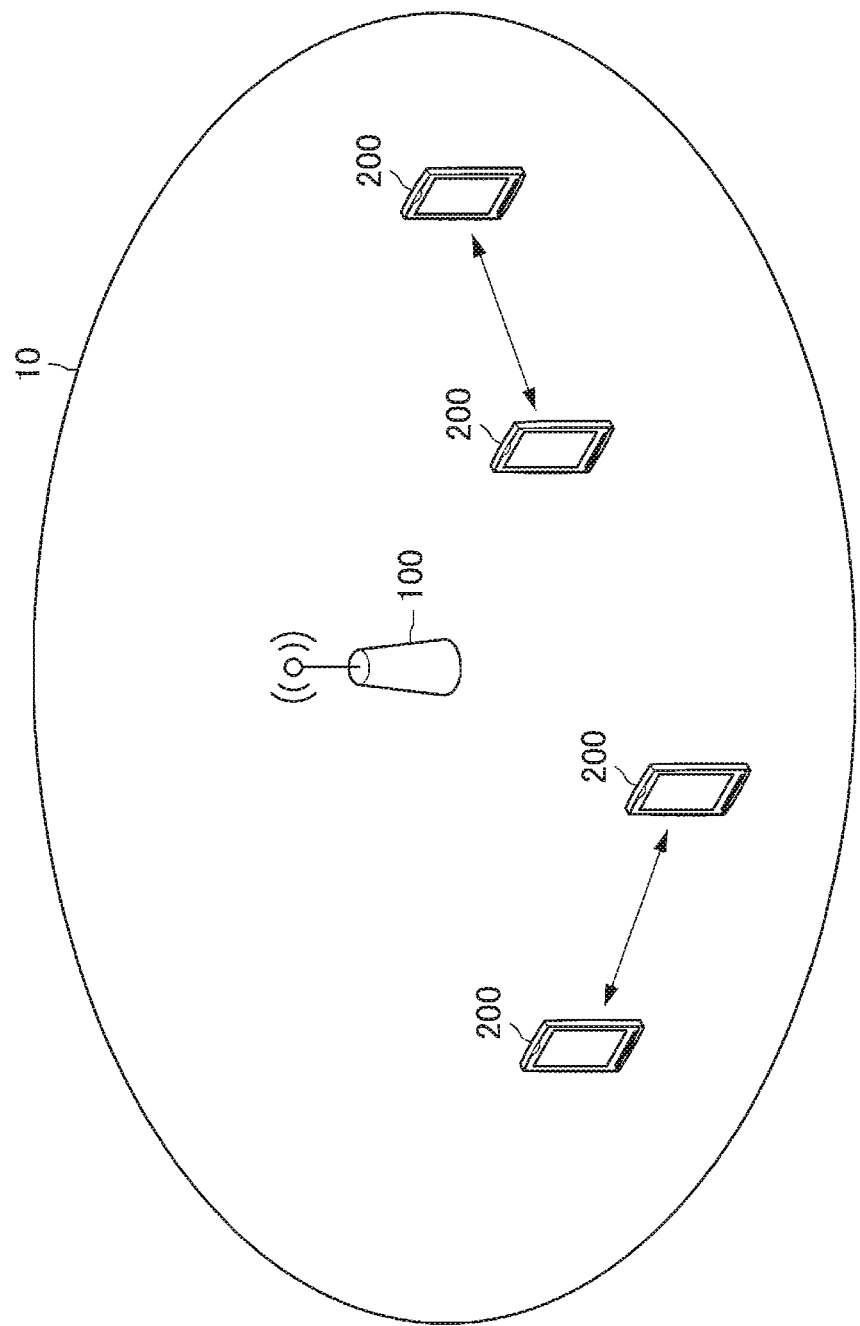
FIG. 2 is an explanatory diagram illustrating an example of a schematic configuration of a communication system according to an embodiment of the present disclosure.

Next, a schematic configuration of a communication system 1 according to an embodiment of the present disclosure will be described with reference to FIG. 2. FIG. 2 is an explanatory diagram illustrating an example of a schematic configuration of a communication system 1 according to an embodiment of the present disclosure. Referring to FIG. 2, the communication system 1 includes a base station 100 and multiple terminal devices 100. The communication system 1 is a system conforming to LTE, LTE-Advanced, or a compliant communication scheme, for example.

(Base Station 100)

The base station 100 wirelessly communicates with the terminal devices 200. For example, the base station 100 wirelessly communications with terminal devices 200 positioned inside a cell 10.

(Terminal Devices 200)

The terminal devices 200 wirelessly communicate with the base station 100. For example, the terminal devices 200 wirelessly communicate with the base station 100 when positioned inside the cell 10.

Particularly, in an embodiment of the present disclosure, a terminal device 200 conducts D2D communication with another terminal device 200. For example, if a terminal device 200 is positioned inside the cell 10 (that is, the coverage of the base station 100), the terminal device 200 conducts in-coverage D2D communication with another terminal device 200 positioned inside the cell 10. Furthermore, if a terminal device 200 is positioned inside the cell 10, the terminal device 200 may also conduct partial-coverage D2D communication with another terminal device 200 positioned outside the cell 10. Also, if a terminal device 200 is positioned outside the cell 10, the terminal device 200 may conduct out-of-coverage D2D communication with another terminal device 200 positioned outside the cell 10, or conduct partial-coverage D2D communication with another terminal device 200 positioned inside the cell 10.

Note that, for the frame format for D2D communication, the frame format for radio communication between the base station and a terminal device is used, for example. For example, radio frames and subframes are used as units of time in D2D communication. Furthermore, even in D2D communication, orthogonal frequency-division multiplexing (OFDM) is used, and resource blocks are used as units of radio resources, for example. Such a resource block is a radio resource extending over 12 subcarriers in the frequency direction, and over 7 OFDM symbols in the time direction.

<<3. Configuration of Respective Communication Nodes>>

Figure 3:
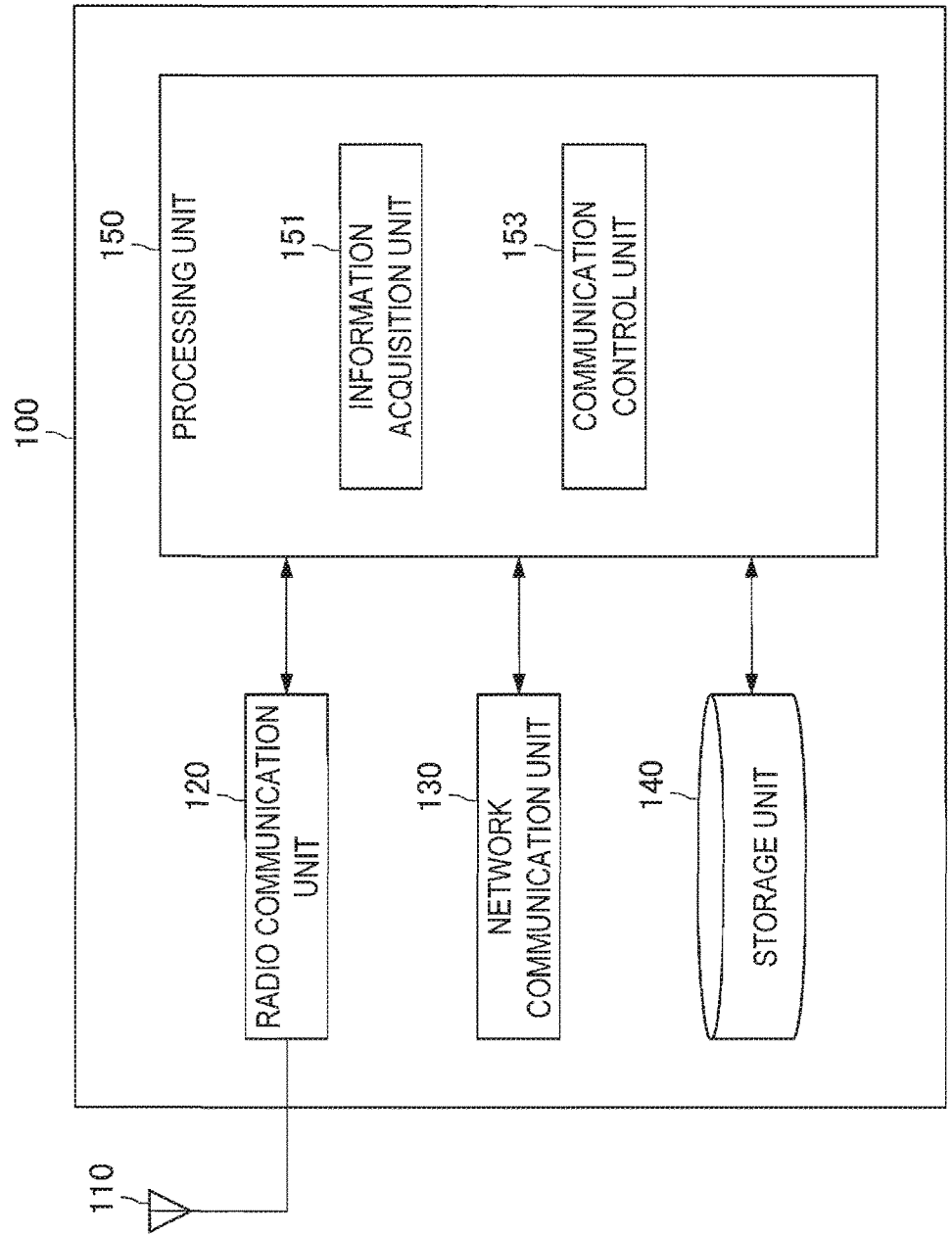
FIG. 3 is a block diagram illustrating an example of a configuration of a base station according to an embodiment of the disclosure.

Next, a configuration of the base station 100 and the terminal device 200 according to an embodiment of the present disclosure will be described with reference to FIGS. 3 to 5.

<3.1. Base Station Configuration>

First, an example of a configuration of a base station 100 according to an embodiment of the present disclosure will be described with reference to FIGS. 3 and 4. FIG. 3 is a block diagram illustrating an example of a configuration of a base station 100 according to an embodiment of the present disclosure. Referring to FIG. 3, the base station 100 is equipped with an antenna unit 110, a radio communication unit 120, a network communication unit 130, a storage unit 140, and a processing unit 150.

(Antenna Unit 110)

The antenna unit 110 emits a signal output by the radio communication unit 120 into space as a radio wave. Additionally, the antenna unit 110 converts a radio wave from space into a signal, and outputs the signal to the radio communication unit 120.

(Radio Communication Unit 120)

The radio communication unit 120 conducts radio communication. For example, the radio communication unit 120 transmits a downlink signal to a terminal device 200 positioned inside the cell 10, and receives an uplink signal from a terminal device 200 positioned inside the cell 10.

(Network Communication Unit 130)

The network communication unit 130 communicates with other communication nodes. For example, the network communication unit 130 communicates with a core network and other base stations.

(Storage Unit 140)

The storage unit 140 temporarily or permanently stores programs and data for the operation of the base station 100.

(Processing Unit 150)

The processing unit 150 provides various functions of the base station 100. The processing unit 150 includes an information acquisition unit 151 and a communication control unit 153.

(Information Acquisition Unit 151)

The information acquisition unit 151 acquires information for the purpose of control by the communication control unit 153.

Particularly, in an embodiment of the present disclosure, the information acquisition unit 151 acquires radio frame information indicating a radio frame for transmitting a discovery signal. The radio frame is a unit time of cellular communication. Also, the discovery signal is a signal is a signal that enables another device to discover a device conducting D2D communication.

The radio frame information indicates, for example, the system frame number (SFN) of the radio frame for transmitting a discovery signal. Hereinafter, a specific example of the radio frame for transmitting a discovery signal will be described with reference to FIG. 4.

Figure 4:
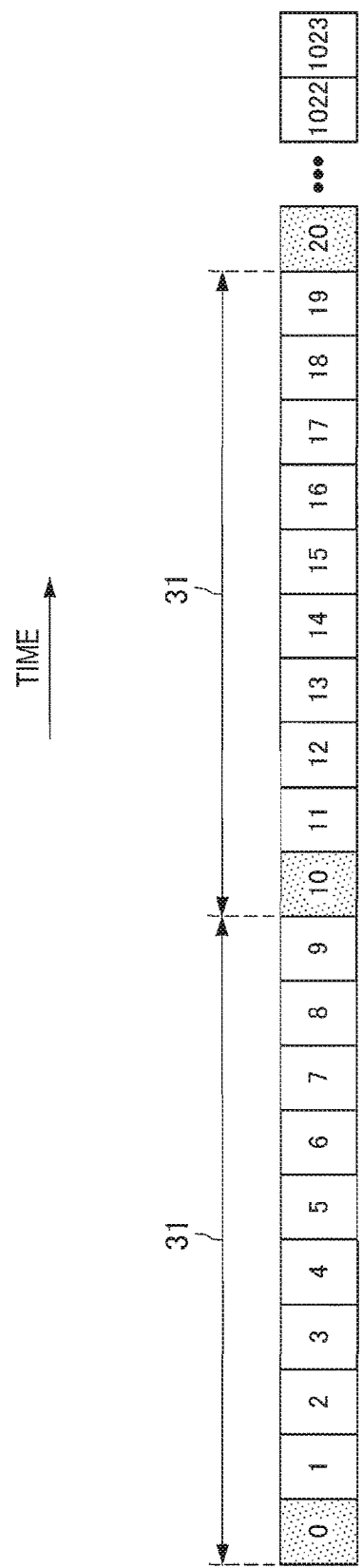
FIG. 4 is an explanatory diagram for illustrating an example of a radio frame for transmitting a discovery signal.
Figure 5:
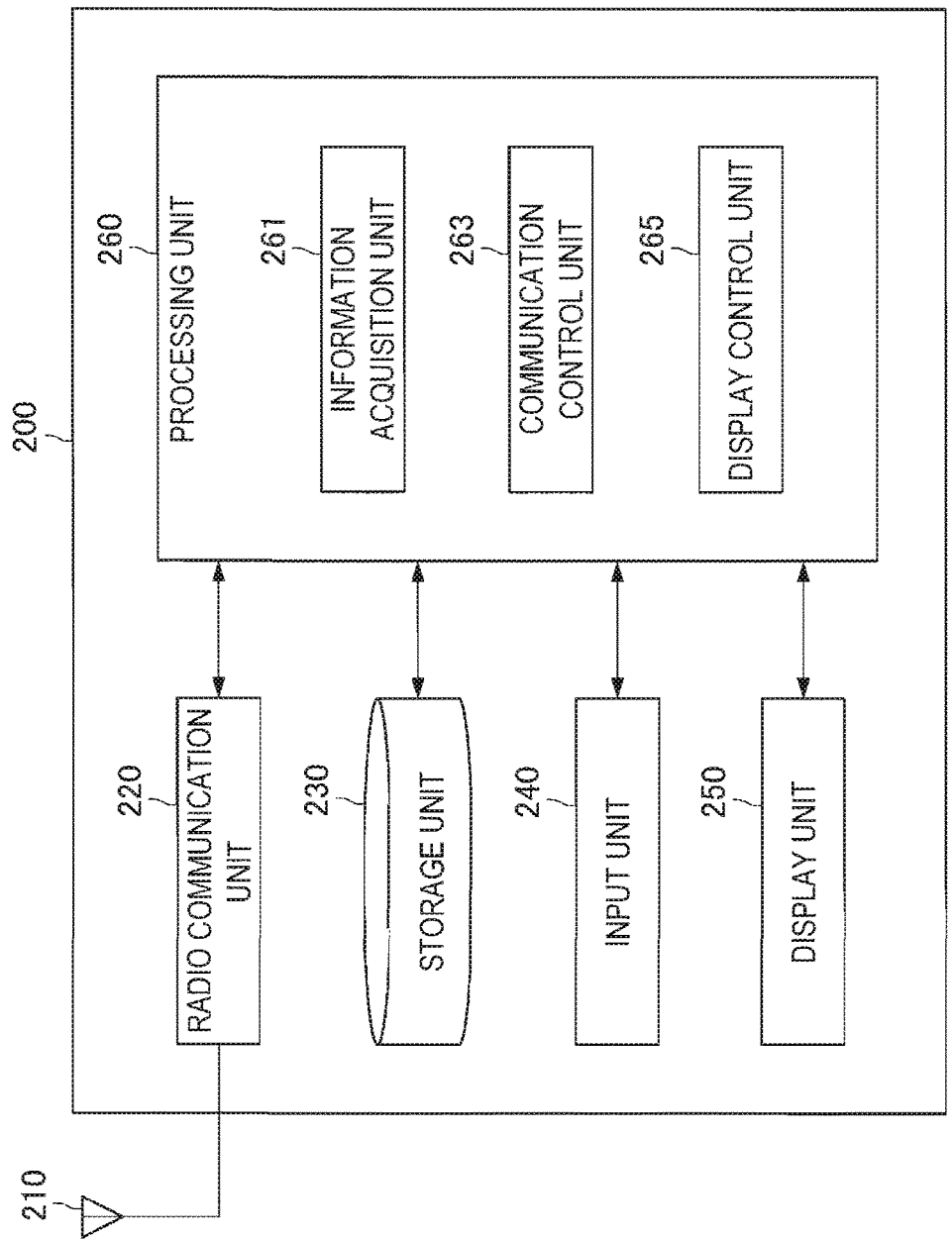
FIG. 5 is a block diagram illustrating an example of a configuration of a terminal device according to the present disclosure.

FIG. 4 is an explanatory diagram for illustrating an example of the radio frame for transmitting a discovery signal. Referring to FIG. 4, part of a series of radio frames having an SFN from 0 to 1023 are illustrated. For example, the radio frame for transmitting a discovery signal is a radio frame arriving each cycle 31. In other words, in this example, the cycle 31 is 10 radio frames (that is, 100 ms), and the radio frames for transmitting a discovery signal are the radio frames having an SFN that is an integer multiple of 10 (the radio frames having an SFN of 0, 10, 20, and so on). For example, if the response rate demanded for the purpose of public safety is 0.1 s (that is, 100 ms), discovery signals may be transmitted on such a cycle 31.

The radio frame for transmitting a discovery signal is predefined, for example, and radio frame information indicating the radio frame is stored in the storage unit 140. The information acquisition unit 151 acquires the radio frame information from the storage unit 140. As an example, the radio frame information is included in system information, and the system information including the radio frame information is stored in the storage unit 140. Subsequently, the information acquisition unit 151 acquires the system information including the radio frame information from the storage unit 140. Note that if the radio frame information is stored in another device without being stored in the storage unit 140, the information acquisition unit 151 may acquire the radio frame information from the other device via the network communication unit 130, for example.

The radio frame information may indicate the SFN of the radio frame on which a discovery signal is transmitted by including the SFN itself, or indicate the SFN by including information for identifying the SFN (for example, the cycle of the SFN, a condition of the SFN, or the like).

(Communication Control Unit 153)

The communication control unit 153 conducts control related to radio communication.

Particularly, in an embodiment of the present disclosure, the communication control unit 153 controls the transmission of the radio frame information to the terminal device 200.

For example, the radio frame information is transmitted as part of the system information. In other words, the communication control unit 153 controls the transmission of the radio frame information to the terminal device 200 so that the radio frame information is transmitted as part of the system information. As a specific process, the communication control unit 153 may, for example, map system information including the radio frame information onto a radio resource allocated to that system information. As a result, the radio frame information is transmitted as part of the system information. Note that the radio frame information may also be transmitted by individual signaling to the terminal device 200, instead of being transmitted as part of the system information.

Consequently, it becomes possible to moderate the load on a terminal device 200 conducting D2D communication, for example.

Specifically, for example, the terminal device 200 may conduct a detection process for detecting a discovery signal on a signal transmitted in a radio frame for transmitting a discovery signal, and rapidly and reliably detect the discovery signal, for example. For this reason, the terminal device 200 may also not conduct the detection process on a signal transmitted in a radio frame other than the radio frame. In other words, the terminal device 200 does not have to conduct the detection process at a high frequency of repetition in order to detect the discovery signal rapidly and reliably. Consequently, the load imposed by the discovery signal detection process may be moderated.

As another example, the terminal device 200 may transmit a discovery signal in a radio frame for transmitting a discovery signal, and not transmit a discovery signal in a radio frame other than the radio frame. In other words, the terminal device 200 does not have to transmit the discovery signal at a high frequency of repetition so that the discovery signal will be detected rapidly and reliably by another terminal device 200. Consequently, the load imposed by the transmission of the discovery signal may be moderated.

Note that with typical paging, the radio frame in which a terminal device receives a paging message differs depending on the terminal device, and thus the base station transmits paging messages at a high frequency of repetition for all terminal devices. On the other hand, since the radio frame in which a discovery signal is received may be common among the terminal devices 200, a terminal device 200 does not have to transmit a discovery signal at a high frequency of repetition. In other words, the radio frame for transmitting a discovery signal does not have to appear at a high frequency of repetition like a paging frame. For this reason, the load imposed by the transmission of the discovery signal may be moderated.

<3.2. Terminal Device Configuration>

Next, an example of a configuration of a terminal device 200 according to an embodiment of the present disclosure will be described with reference to FIG. 5. FIG. 5 is a block diagram illustrating an example of a configuration of a terminal device 200 an embodiment of the present disclosure. Referring to FIG. 5, the terminal device 200 is equipped with an antenna unit 210, a radio communication unit 220, a storage unit 230, an input unit 240, a display unit 250, and a processing unit 260.

(Antenna Unit 210)

The antenna unit 210 emits a signal output by the radio communication unit 220 into space as a radio wave. Additionally, the antenna unit 210 converts a radio wave from space into a signal, and outputs the signal to the radio communication unit 220.

(Radio Communication Unit 220)

The radio communication unit 220 conducts radio communication. For example, if the terminal device 200 is positioned inside the cell 10, the radio communication unit 220 receives a downlink signal from the base station 100, and transmits an uplink signal to the base station 100. As another example, in D2D communication, the radio communication unit 220 receives a signal from another terminal device 200, and transmits a signal to another terminal device 200.

(Storage Unit 230)

The storage unit 230 temporarily or permanently stores programs and data for the operation of the terminal device 200.

(Input Unit 240)

The input unit 240 receives input from a user of the terminal device 200. The input unit 240 then provides an input result to the processing unit 260.

(Display Unit 250)

The display unit 250 displays an output screen (that is, an output image) from the terminal device 200. For example, the display unit 250 displays an output screen according to control by the processing unit 260 (display control unit 265).

(Processing Unit 260)

The processing unit 260 provides various functions of the terminal device 200. The processing unit 260 includes an information acquisition unit 261, a communication control unit 263, and a display control unit 265.

(Information Acquisition Unit 261)

The information acquisition unit 261 acquires information for the purpose of control by the communication control unit 263.

Particularly, in an embodiment of the present disclosure, the information acquisition unit 261 acquires radio frame information indicating a radio frame for transmitting a discovery signal. The specific content of the radio frame information is as discussed earlier.

For example, the radio frame information is transmitted by the base station 100 as part of the system information. In this case, the information acquisition unit 261 acquires the radio frame information included in the system information.

Note that the radio frame information may also be transmitted by individual signaling to the terminal device 200, instead of being transmitted as part of the system information. Also, the radio frame information may also be stored in advance in the terminal device 200 (storage unit 230), without being transmitted by the base station 100. This point applies similarly to the respective modifications of an embodiment of the present disclosure discussed later.

(Communication Control Unit 263)

The communication control unit 263 conducts control related to radio communication by the terminal device 200.

Control Related to Transmission of Discovery Signal

For example, the terminal device 200 acts as the discovery signal transmitting side, and transmits a discovery signal. In this case, the communication control unit 263 controls the transmission of the discovery signal on the basis of the radio frame information.

Specifically, for example, when the terminal device 200 transmits the discovery signal, the communication control unit 263 controls the transmission of the discovery signal so that the discovery signal is transmitted in radio frames indicated by the radio frame information, and so that the discovery signal is not transmitted in other radio frames. As an example, referring again to FIG. 4, the communication control unit 263 controls the transmission of the discovery signal so that the discovery signal is transmitted in radio frames having an SFN that is an integer multiple of 10 (the radio frames having an SFN of 0, 10, 20, and so on), and so that the discovery signal is not transmitted in other radio frames. Note that the discovery signal is transmitted with, for example, predetermined radio resources inside radio frames indicated by the radio frame information (for example, predetermined resource blocks of predetermined subframes).

As a specific process, the communication control unit 263 may, for example, map a discovery signal onto predetermined radio resources inside radio frames indicated by the radio frame information. Consequently, the discovery signal is transmitted with predetermined radio resources inside radio frames indicated by the radio frame information.

Control Related to Detection of Discovery Signal

For example, the terminal device 200 acts as the discovery signal receiving side, and conducts a detection process for detecting a discovery signal. In this case, the communication control unit 263 controls a detection process for detecting a discovery signal on the basis of the radio frame information.

Specifically, for example, when the terminal device 200 conducts a detection process for detecting a discovery signal, the communication control unit 263 controls the detection process so that the detection process is conducted on signals transmitted in radio frames indicated by the radio frame information, and so that the detection process is not conducted on signals transmitted in other radio frames. As an example, referring again to FIG. 4, the communication control unit 263 controls the detection process so that the detection process is conducted on signals transmitted in radio frames having an SFN that is an integer multiple of 10 (the radio frames having an SFN of 0, 10, 20, and so on), and so that the detection process is not conducted on signals transmitted in other radio frames. Note that the detection process is conducted on signals transmitted with, for example, predetermined radio resources inside radio frames indicated by the radio frame information (for example, predetermined resource blocks of predetermined subframes).

As a specific process, for example, the communication control unit 263 determines whether or not a sequence in a signal transmitted with predetermined radio resources inside a radio frame indicated by the radio frame information matches a discovery signal sequence. When these sequences match, a discovery signal is detected, whereas when these sequences do not match, a discovery signal is not detected.

Control Related to Transmission of System Information Including SFN

Note that the communication control unit 263 may also control the transmission of system information including a system frame number (SFN). In other words, according to control by the communication control unit 263, the terminal device 200 may also transmit system information including an SFN. As an example, according to control by the communication control unit 263, the terminal device 200 may transmit a master information block (MIB) including an SFN.

Consequently, for example, even if two or more terminal devices 200 are positioned outside the coverage (cell 10) of the base station 100, the sharing of an SFN between the two or more terminal devices 200 becomes possible.

(Display Control Unit 265)

The display control unit 265 controls the display of an output screen by the display unit 250. For example, the display control unit 265 generates an output screen to be displayed by the display unit 250, and causes the display unit 250 to display that output screen.

<<4. Process Flow>>

Next, a communication control process according to an embodiment of the present disclosure will be described with reference to FIGS. 6 to 8.

(Communication Control Process on Base Station Side)

Figure 6:
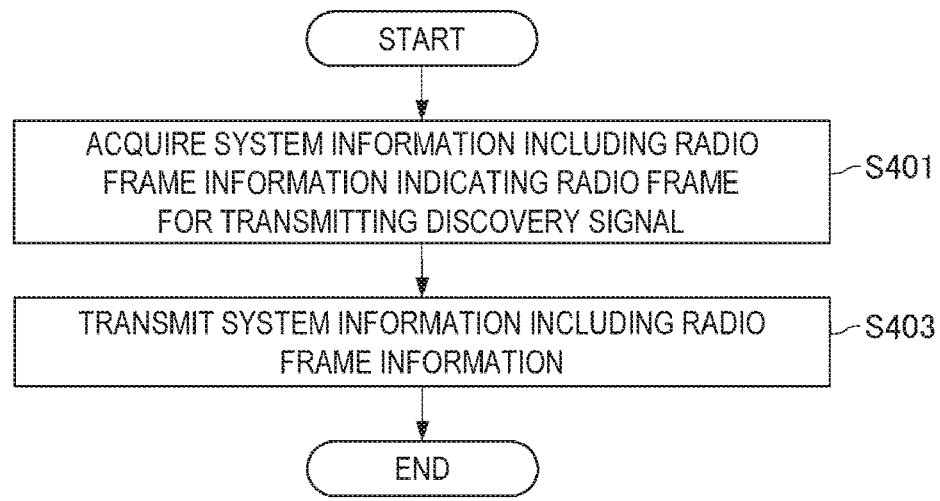
FIG. 6 is a flowchart illustrating an example of a schematic flow of a communication control process on the base station side according to an embodiment of the present disclosure.

FIG. 6 is a flowchart illustrating an example of a schematic flow of a communication control process on the base station side according to an embodiment of the present disclosure.

First, the information acquisition unit 151 acquires system information including radio frame information indicating a radio frame for transmitting a discovery signal (S401).

Subsequently, the base station 100, according to control by the communication control unit 153, transmits the system information including the radio frame information (S403). The process then ends.

Note that the communication control process discussed above is conducted every time the system information is transmitted.

(First Communication Control Process on Terminal Device Side: Transmission of Discovery Signal)

Figure 7:
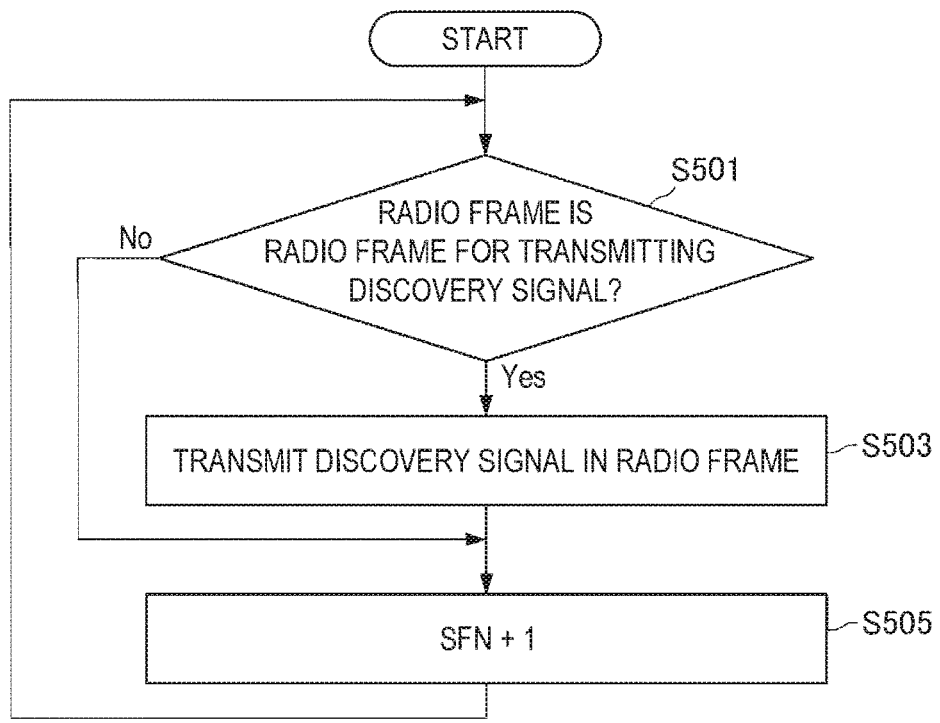
FIG. 7 is a flowchart illustrating an example of a schematic flow of a first communication control process on the terminal device side according to an embodiment of the present disclosure.

FIG. 7 is a flowchart illustrating an example of a schematic flow of a first communication control process on the terminal device side according to an embodiment of the present disclosure. The first communication control process is conducted when the terminal device 200 transmits a discovery signal.

When the radio frame is a radio frame for transmitting a discovery signal (S501: Yes), the terminal device 200, according to control by the communication control unit 263, transmits a discovery signal in the radio frame (S503).

Subsequently, the system frame number is incremented (S505), and the process is repeated.

On the other hand, when the radio frame is not a radio frame for transmitting a discovery signal (S501: No), a discovery signal is not transmitted. Subsequently, the system frame number is incremented (S505), and the process is repeated.

(Second Communication Control Process on Terminal Device Side: Detection of Discovery Signal)

FIG. 8 is a flowchart illustrating an example of a schematic flow of a second communication control process on the terminal device side according to an embodiment of the present disclosure. The second communication control process is conducted when the terminal device 200 conducts the detection process for detecting a discovery signal.

When the radio frame is a radio frame for transmitting a discovery signal (S601: Yes), the terminal device 200, according to control by the communication control unit 263, conducts the detection process for detecting a discovery signal on the signal transmitted in the radio frame (S603). Subsequently, the system frame number is incremented (S605), and the process is repeated.

When the radio frame is not a radio frame for transmitting a discovery signal (S601: No), the detection process is not conducted on the signal transmitted in the radio frame. Subsequently, the system frame number is incremented (S605), and the process is repeated.

<<5. Modifications>>

Next, first to fifth modifications of an embodiment of the present disclosure will be described with reference to FIGS. 9 to 22.

<5.1. First Modification>

First, a first modification of an embodiment of the present disclosure will be described with reference to FIGS. 9 to 11.

(Summary)

In the first modification, each of multiple radio frames in which a discovery signal is transmitted corresponds to any one meaning from among two or more meanings. Additionally, the terminal device 200 on the transmitting side transmits a discovery signal in a radio frame corresponding to a meaning to be reported. The terminal device 200 on the receiving side, upon detecting the discovery signal, identifies the meaning corresponding to the radio frame.

Consequently, for example, by only transmitting and receiving a discovery signal, it becomes possible for the terminal device 200 on the receiving side to identify a meaning to be reported by the terminal device 200 on the transmitting side. For this reason, the rapid conveyance of meaning becomes possible. More specifically, for example, in D2D communication, when data indicating a meaning is transmitted and received after a connection is established through multiple transactions, the time taken to convey the meaning becomes long. On the other hand, when a discovery signal is transmitted and received in a radio frame corresponding to a meaning, the time taken to convey the meaning becomes short. For this reason, conveyance of the meaning becomes rapid. Note that when the purpose of D2D communication is for public safety, the urgency is high, and thus such rapid conveyance of meaning is particularly effective.

(Radio Frame Information)

Particularly, in the first modification, the radio frame information indicates multiple radio frames for transmitting a discovery signal. As an example, like the example illustrated in FIG. 4, the radio frame information indicates radio frame having an SFN that is an integer multiple of 20 (the radio frames having an SFN of 0, 10, 20, and so on).

Furthermore, in the first modification in particular, each of multiple radio frames corresponds to any one meaning from among two or more meanings. The two or more meanings include meanings related to public safety, for example. Hereinafter, a specific example of correspondence relationships between radio frames and meanings will be described with reference to FIG. 9.

FIG. 9 is an explanatory diagram for illustrating an example of correspondence relationships between radio frames and meanings. Referring to FIG. 9, correspondence relationships between meanings and radio frames are illustrated. For example, the radio frames having the SFN of 100, 200 and 300 correspond to the meaning of a fire alert, while the radio frames having the SFN of 500, 600, and 700 correspond to the meaning of a burglar alarm.

The examples of meanings illustrated in FIG. 9 (fire alert and burglar alarm) may also be said to be purposes of D2D communication. In this way, each of the above two or more meanings may match a purpose of D2D communication.

Note that, for example, the radio frame information additionally indicates which meaning from among the two or more meanings each of the multiple radio frames corresponds to. As an example, the radio frame information indicates correspondence relationships as illustrated in FIG. 9, for example. Consequently, for example, it becomes possible for the terminal device 200 to know the correspondence relationships in advance. Obviously, the information indicating the multiple radio frames and the information indicating which meaning among the two or more meanings each of the multiple radio frames corresponds to may be included in the radio frame information as integrated information, or as separate information.

(Base Station 100: Communication Control Unit 153)

As discussed above, the communication control unit 153 controls the transmission of the radio frame information to the terminal device 200.

As discussed above, the information indicating the multiple radio frames and the information indicating which meaning among the two or more meanings each of the multiple radio frames corresponds to may be included in the radio frame information as separate information. In this way, the communication control unit 153 may control the transmission of the radio frame information so that the separate information is transmitted separately, or control the transmission of the radio frame information so that the separate information is transmitted collectively.

(Terminal Device 200: Communication Control Unit 263)
Control Related to Transmission of Discovery Signal Particularly, in the first modification, the communication control unit 263 controls the transmission of a discovery signal so that the discovery signal is transmitted in a radio frame corresponding to a meaning to be reported from among the multiple radio frames.

As a specific example, referring again to FIG. 9, when the meaning to be reported is a fire alert, a discovery signal is transmitted in the radio frames having an SFN of 100, 200, and 300, according to control by the communication control unit 263. Also, when the meaning to be reported is a burglar alarm, a discovery signal is transmitted in the radio frames having an SFN of 500, 600, and 700, according to control by the communication control unit 263.

Note that the meaning to be reported (such as a fire alert or a burglar alarm, for example) is decided according to the application that requests D2D communication, as one example.

Control Related to Detection of Discovery Signal

Particularly, in the first modification, the communication control unit 263, upon detecting a discovery signal, identifies the meaning corresponding to the radio frame in which the detected discovery signal was transmitted from among the multiple radio frames.

As a specific example, referring again to FIG. 9, when a discovery signal is detected in a radio frame having an SFN of 100, 200, or 300, the communication control unit 263 identifies a fire alert as the meaning corresponding to the radio frame. Also, when a discovery signal is detected in a radio frame having an SFN of 500, 600, or 700, the communication control unit 263 identifies a burglar alarm as the meaning corresponding to the radio frame.

(Process Flow: First Communication Control Process on Terminal Device Side: Transmission of Discovery Signal)

Figure 10:
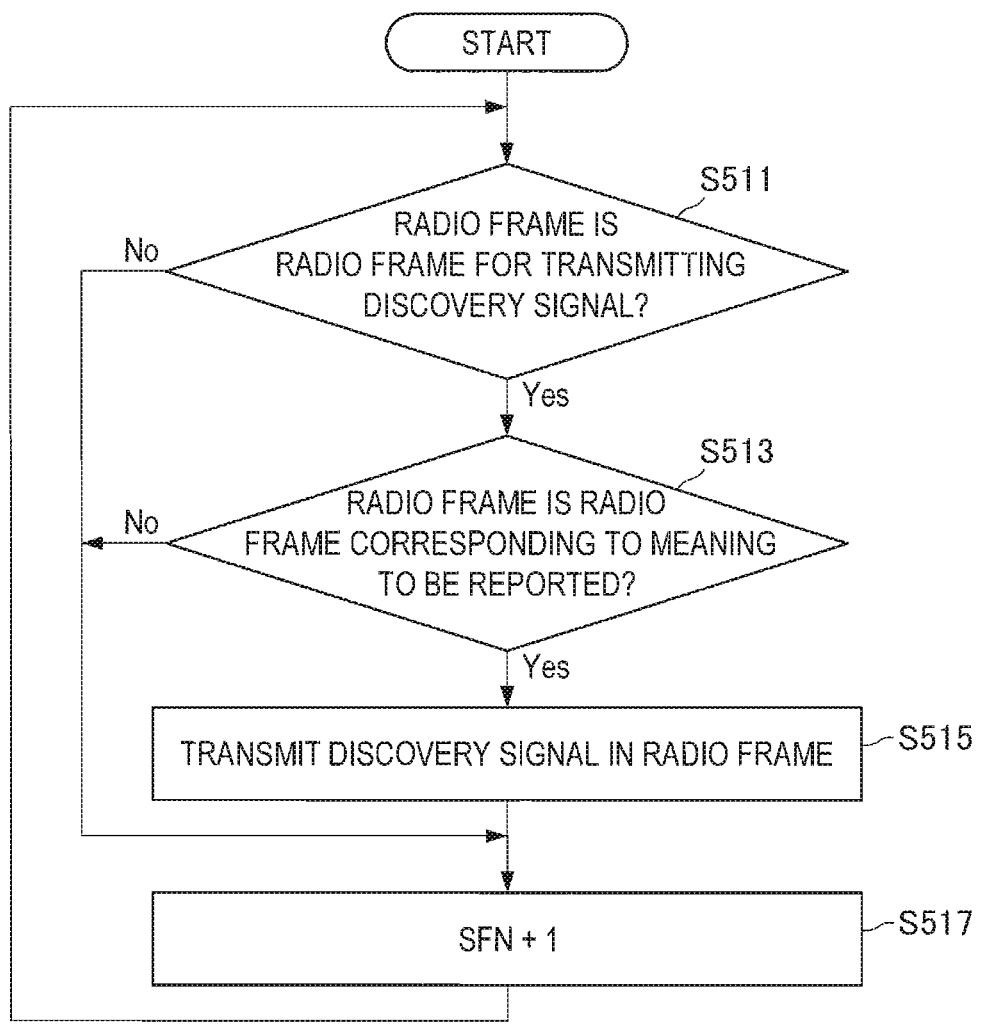
FIG. 10 is a flowchart illustrating an example of a schematic flow of a first communication control process on the terminal device side according to a first modification of an embodiment of the present disclosure.

FIG. 10 is a flowchart illustrating an example of a schematic flow of a first communication control process on the terminal device side according to a first modification of an embodiment of the present disclosure. The first communication control process is conducted when the terminal device 200 transmits a discovery signal.

When the radio frame is a radio frame for transmitting a discovery signal (S511: Yes), and a radio frame corresponding to a meaning to be reported (S513: Yes), the terminal device 200, according to control by the communication control unit 263, transmits a discovery signal in the radio frame (S515). Subsequently, the system frame number is incremented (S517), and the process is repeated.

On the other hand, if the radio frame is not a radio frame for transmitting a discovery signal (S511: No), or is not a radio frame corresponding to a meaning to be transmitted (S513: No), a discovery signal is not transmitted. Subsequently, the system frame number is incremented (S517), and the process is repeated.

(Process Flow: Second Communication Control Process on Terminal Device Side: Identification of Meaning)

Figure 11:
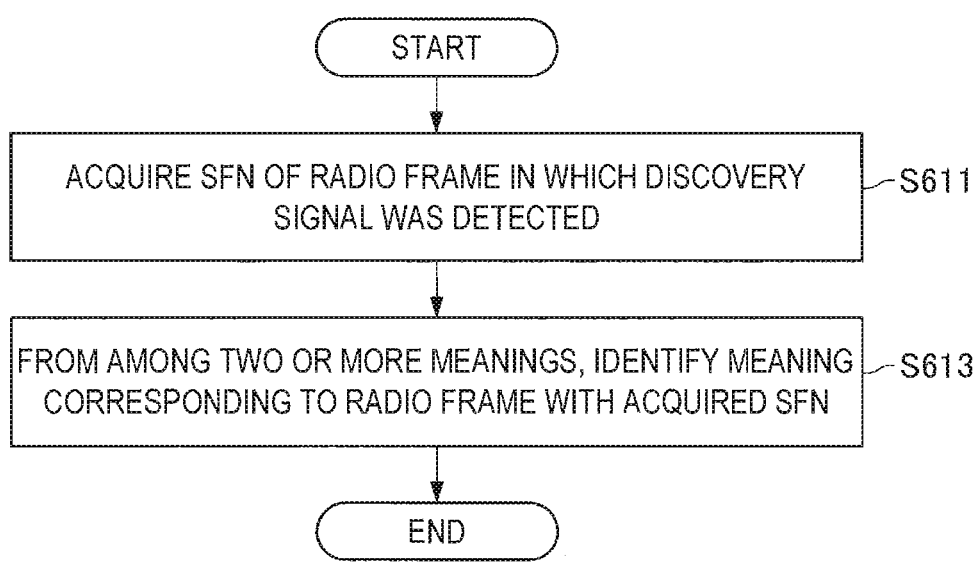
FIG. 11 is a flowchart illustrating an example of a schematic flow of a second communication control process on the terminal device side according to a first modification of an embodiment of the present disclosure.

FIG. 11 is a flowchart illustrating an example of a schematic flow of a second communication control process on the terminal device side according to a first modification of an embodiment of the present disclosure. The second communication control process is conducted after the terminal device 200 detects a discovery signal.

First, the communication control unit 263 acquires the SFN of the radio frame in which a discovery signal was detected (S611).

Subsequently, the communication control unit 263 identifies the meaning corresponding to the radio frame having the acquired SFN, from among two or more meanings (S613). The process then ends.

<5.2 Second Modification>

Next, a second modification of an embodiment of the present disclosure will be described with reference to FIGS. 12 to 14.

(Summary)

In the second modification, the terminal device 200 on the transmitting side transmits a discovery signal at a frequency of repetition that depends on the purpose of the D2D communication. Also, the terminal device 200 on the receiving side conducts the detection process for detecting a discovery signal at a frequency of repetition that depends on the purpose of the D2D communication.

Consequently, for example, it becomes possible to moderate power consumption for discovery, while still satisfying the demand on the time required for discovery.

Specifically, for example, the demand on the time required for discovery may differ depending on the purpose of the D2D communication (such as collision warning, fire alert, and burglar alarm, for example). As an example, when the purpose of the D2D communication is a collision warning, the time required for discovery is demanded to be within a first time, whereas when the purpose of the D2D communication is a fire alert, the time required for discovery is demanded to be within a second time that is longer than the first time. In such cases, if the frequency of repetition of the discovery signal is stipulated so that the time required for discovery is within the first time, for example, when a terminal device conducts D2D communication for a fire alert but does not conduct D2D communication for a collision warning, the terminal device will transmit or detect a discovery signal at a higher frequency of repetition than is required. As a result, power may be wasted in the transmission or detection of a discovery signal. On the other hand, if the frequency of repetition of the discovery signal is stipulated so that the time required for discovery is within the second time, for example, when a terminal device conducts D2D communication for a collision warning, the terminal device will transmit or detect a discovery signal at an insufficient frequency of repetition. As a result, the demand on the time required for discovery is not satisfied. Accordingly, by transmitting a discovery signal and conducting the detection process at a frequency of repetition that depends on the purpose, it becomes possible to moderate power consumption for discovery, while still satisfying the demand on the time required for discovery.

(Radio Frame Information)

Particularly, in the second modification, the radio frame information indicates, for each purpose of D2D communication, multiple radio frames for transmitting a discovery signal at a frequency of repetition depending on the purpose.

For example, the radio frame information indicates, for each purpose of D2D communication, a cycle of transmission of a discovery signal depending on the purpose. In other words, by indicating a cycle depending on the purpose, the radio frame information indicates radio frames for transmitting at a frequency of repetition depending on the purpose. Hereinafter, a specific example of a cycle of transmission of a discovery signal depending on the purpose of D2D communication will be described with reference to FIG. 12.

Figure 12:
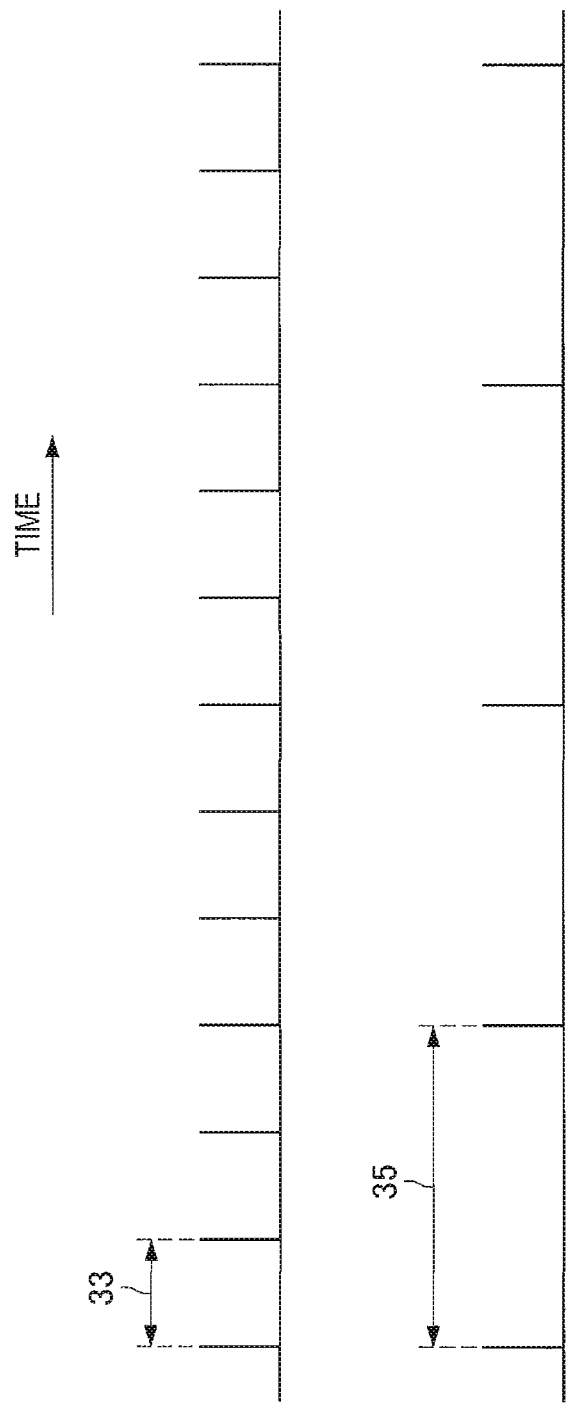
FIG. 12 is an explanatory diagram for illustrating an example of a cycle of transmission of a discovery signal depending on the purpose of D2D communication.

FIG. 12 is an explanatory diagram for illustrating an example of a cycle of transmission of a discovery signal depending on the purpose of D2D communication. Referring to FIG. 12, a first cycle 33 of transmission of a discovery signal and a second cycle 35 of transmission of a discovery signal are illustrated. For example, the first cycle 33 is the cycle when the purpose of D2D communication is a collision warning, and is 100 ms (10 radio frames). On the other hand, the second cycle 35 is the cycle when the purpose of D2D communication is a fire alert, and is 300 ms (30 radio frames). In this way, a discovery signal is transmitted on a cycle depending on the purpose of D2D communication.

Note that although an example of cyclically transmitting a discovery signal is described, the second modification is not limited to such an example. For example, a discovery signal may also be transmitted at non-periodic intervals, without being transmitted cyclically (that is, at fixed intervals).

(Terminal Device 200: Communication Control Unit 263)

Control Related to Transmission of Discovery Signal

Particularly, in the second modification, the communication control unit 263 controls the transmission of a discovery signal so that the discovery signal is transmitted at a frequency of repetition depending on the purpose of D2D communication.

For example, the communication control unit 263 controls the transmission of a discovery signal so that the discovery signal is transmitted on a cycle depending on the purpose of D2D communication. As a specific example, referring to FIG. 12, when the purpose of D2D communication by a terminal device 200 is a collision warning, the terminal device 200, according to control by the communication control unit 263, transmits a discovery signal on the first cycle 33. In other words, the terminal device 200 transmits a discovery signal every 10 radio frames (every 100 ms). Also, when the purpose of D2D communication by a terminal device 200 is a fire alert, the terminal device 200, according to control by the communication control unit 263, transmits a discovery signal on the second cycle 35. In other words, the terminal device 200 transmits a discovery signal every 30 radio frames (every 300 ms). Note that when the purpose of D2D communication by a terminal device 200 includes both a collision warning and a fire alert, the terminal device 200 transmits discovery signals on the first cycle 33 and the second cycle 35.

Note that the purpose of D2D communication (such as a collision warning, a fire alert, or a burglar alarm, for example) is decided according to the application that requests D2D communication, as one example.

Control Related to Detection of Discovery Signal

Particularly, in the second modification, the communication control unit 263 controls the detection process for detecting a discovery signal so that the detection process is conducted at a frequency of repetition depending on the purpose of D2D communication.

For example, the communication control unit 263 controls the detection process so that the detection process is conducted on a cycle depending on the purpose of D2D communication. As a specific example, referring to FIG. 12, when the purpose of D2D communication by a terminal device 200 is a collision warning, the terminal device 200, according to control by the communication control unit 263, conducts the detection process on the first cycle 33. In other words, the terminal device 200 conducts the detection process every 10 radio frames (every 100 ms). Also, when the purpose of D2D communication by a terminal device 200 is a fire alert, the terminal device 200, according to control by the communication control unit 263, conducts the detection process on the second cycle 35. In other words, the terminal device 200 conducts the detection process every 30 radio frames (every 300 ms). Note that when the purpose of D2D communication by a terminal device 200 includes both a collision warning and a fire alert, the terminal device 200 conducts the detection process on the first cycle 33 and the second cycle 35.

Note that, as discussed above, the purpose of D2D communication (such as a collision warning, a fire alert, or a burglar alarm, for example) is decided according to the application that requests D2D communication, as one example.

(Process Flow: First Communication Control Process on Terminal Device Side: Transmission of Discovery Signal)

Figure 13:
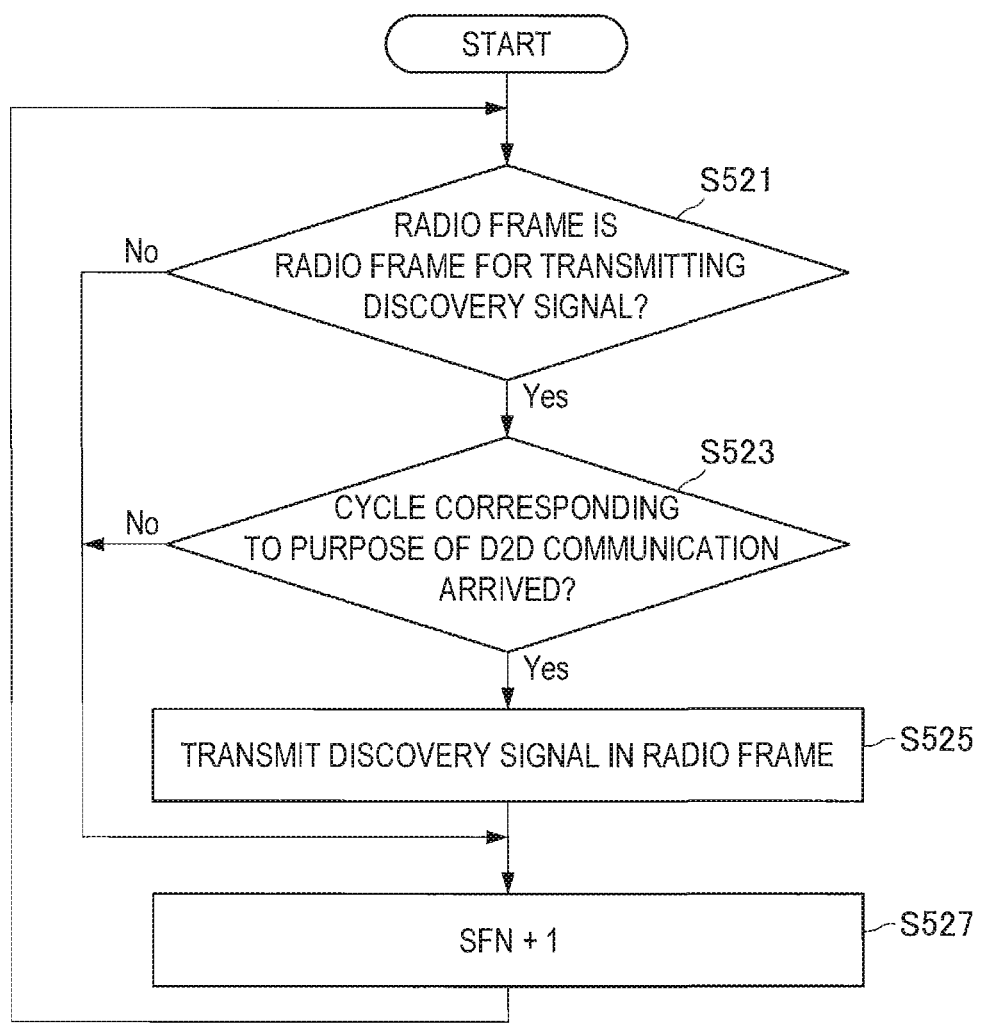
FIG. 13 is a flowchart illustrating an example of a schematic flow of a first communication control process on the terminal device side according to a second modification of an embodiment of the present disclosure.

FIG. 13 is a flowchart illustrating an example of a schematic flow of a first communication control process on the terminal device side according to a second modification of an embodiment of the present disclosure. The first communication control process is conducted when the terminal device 200 transmits a discovery signal.

When the radio frame is a radio frame for transmitting a discovery signal (S521: Yes), and a cycle corresponding to the purpose of D2D communication for a terminal device 200 arrives (S523: Yes), the terminal device 200, according to control by the communication control unit 263, transmits a discovery signal in the radio frame (S525). Subsequently, the system frame number is incremented (S527), and the process is repeated.

On the other hand, if the radio frame is not a radio frame for transmitting a discovery signal (S521: No), or if a cycle corresponding to the purpose of D2D communication for the terminal device 200 does not arrive (S523: No), a discovery signal is not transmitted. Subsequently, the system frame number is incremented (S527), and the process is repeated.

(Process Flow: Second Communication Control Process on Terminal Device Side: Detection of Discovery Signal)

Figure 14:
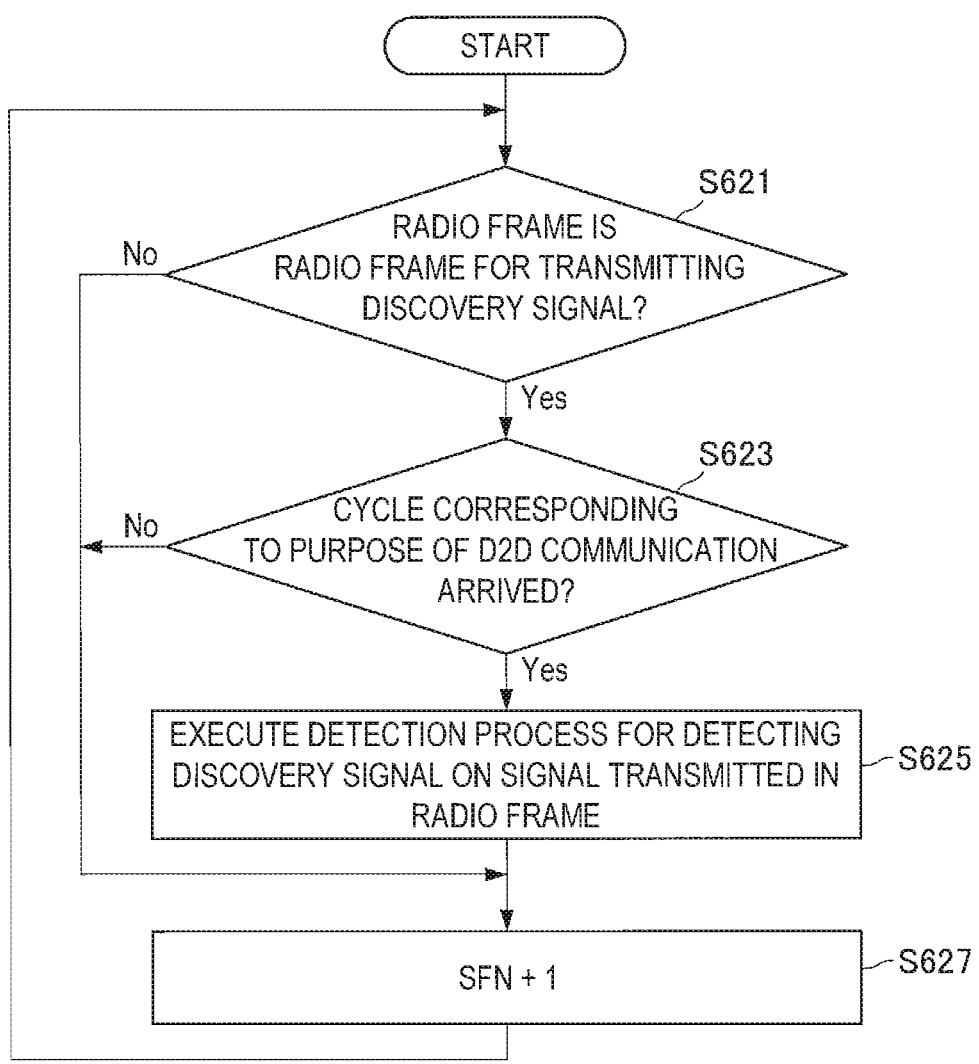
FIG. 14 is a flowchart illustrating an example of a schematic flow of a second communication control process on the terminal device side according to a second modification of an embodiment of the present disclosure.

FIG. 14 is a flowchart illustrating an example of a schematic flow of a second communication control process on the terminal device side according to a second modification of an embodiment of the present disclosure. The second communication control process is conducted when the terminal device 200 conducts the detection process for detecting a discovery signal.

When the radio frame is a radio frame for transmitting a discovery signal (S621: Yes), and a cycle corresponding to the purpose of D2D communication for a terminal device 200 arrives (S623: Yes), the terminal device 200, according to control by the communication control unit 263, conducts the detection process for detecting a discovery signal on the signal transmitted in the radio frame (S625). Subsequently, the system frame number is incremented (S627), and the process is repeated.

On the other hand, if the radio frame is not a radio frame for transmitting a discovery signal (S621: No), or if a cycle corresponding to the purpose of D2D communication for the terminal device 200 does not arrive (S623: No), the detection process is not conducted on the signal transmitted in the radio frame. Subsequently, the system frame number is incremented (S627), and the process is repeated.

<5.3. Third Modification>

Next, a third modification of an embodiment of the present disclosure will be described with reference to FIGS. 15 to 18.

(Summary)

Particularly, in the third modification, the terminal device 200 on the transmitting side, after transmitting a discovery signal, transmits information to be reported in a predetermined radio resource. Also, the terminal device 200 on the receiving side, after detecting a discovery signal, acquires information received in the predetermined radio resource.

Consequently, for example, it becomes possible to convey detailed information rapidly.

Specifically, for example, when a radio frame corresponds to one meaning, like in the first modification, rapid conveyance of the meaning through transmission and reception of a discovery signal becomes possible, but the conveyance of detailed information is difficult. Also, if detailed information is transmitted and received after a connection is established through multiple transactions, the time taken to convey the detailed information becomes long. Accordingly, by transmitting and receiving information to be reported in a predetermined radio resource after a discovery signal, it becomes possible to convey detailed information rapidly.

Note that in cases such as when the purpose of D2D communication is data offloading, a large amount of data is transmitted and received by D2D communication, and thus the establishment of a connection is effective. However, when the purpose of D2D communication is public safety, the urgency is often high, and thus the technique according to the third modification is effective.

(Base Station 100: Information Acquisition Unit 151)

Particularly, in the third modification, the information acquisition unit 151 additionally acquires radio resource information indicating a predetermined radio resource for transmitting information to be reported after the transmission of a discovery signal.

For example, the radio resource information indicates predetermined radio resources for transmitting information to be reported after the transmission of a discovery signal. Hereinafter, a specific example of predetermined radio resources for transmitting information to be reported will be described with reference to FIG. 15.

Figure 15:
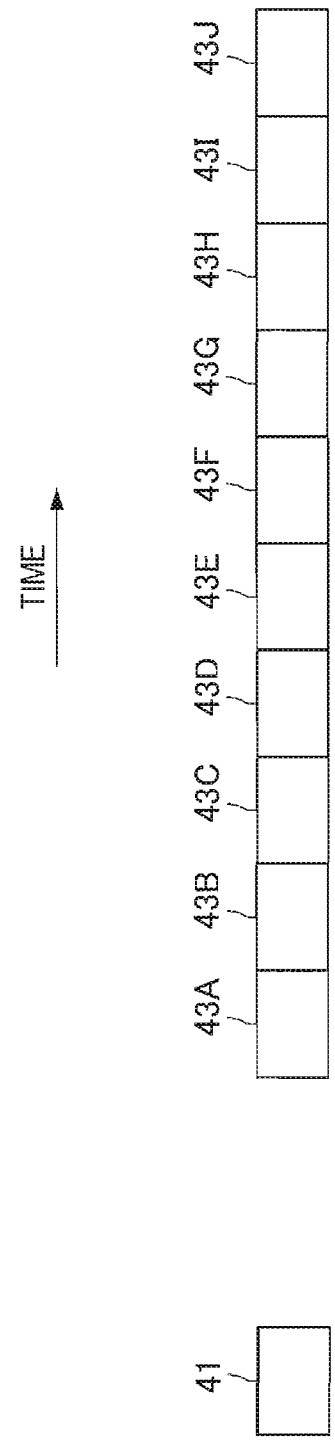
FIG. 15 is an explanatory diagram for illustrating an example of predetermined radio resources for transmitting information to be reported.

FIG. 15 is an explanatory diagram for illustrating an example of predetermined radio resources for transmitting information to be reported. Referring to FIG. 15, a radio resource 41 for transmitting a discovery signal and predetermined radio resources 43 for transmitting information to be reported (that is, radio resources 43A to 43J) are illustrated. The predetermined radio resources 43 are positioned after the radio resource 41 in the time direction. For example, the radio resource 41 is positioned at a fixed time among the radio frames, and is also positioned in a fixed band among the entire frequency band. Also, each of the predetermined radio resources 43 is positioned at a fixed time among the radio frames, and is also positioned in a fixed band among the entire frequency band. Note that the radio resource 41 is a radio resource including one or more resource elements or one or more resource blocks, for example. Also, each of the radio resources 43A to 43J is a radio resource including one or more resource blocks, for example. Note that although an example of arranging the predetermined radio resources 43A to 43J in the time direction is described, an embodiment of the present disclosure is not limited to such an example. The predetermined radio resources 43A to 43J may also be arranged in the frequency direction, or dispersively positioned in the frequency direction and/or the time direction.

The predetermined radio resources are predefined, for example, and the radio resource information indicating the predetermined radio resources are stored in the storage unit 140. The information acquisition unit 151 acquires the above radio resource information from the storage unit 140. As an example, the above radio resource information is included in system information, and the system information including the radio resource information is stored in the storage unit 140. Subsequently, the information acquisition unit 151 acquires the system information including the radio resource information from the storage unit 140. Note that if the above radio resource information is stored in another device without being stored in the storage unit 140, the information acquisition unit 151 may acquire the radio resource information from the other device via the network communication unit 130, for example.

(Base Station 100: Communication Control Unit 153)

Particularly, in the third modification, the communication control unit 153 controls the transmission of the radio resource information to the terminal device 200.

For example, the radio resource information is transmitted as part of the system information. In other words, the communication control unit 153 controls the transmission of the radio resource information to the terminal device 200 so that the radio resource information is transmitted as part of the system information. As a specific process, the communication control unit 153 may, for example, map system information including the radio resource information onto a radio resource allocated to that system information. Consequently, the radio resource information is transmitted as part of the system information. Note that the radio resource information may also be transmitted by individual signaling to the terminal device 200, instead of being transmitted as part of the system information.

(Terminal Device 200: Information Acquisition Unit 261)

Particularly, in the third modification, the information acquisition unit 261 acquires radio resource information indicating a predetermined radio resource for transmitting information to be reported after the transmission of a discovery signal. The specific content of the radio frame information is as discussed earlier.

For example, the radio resource information is transmitted by the base station 100 as part of the system information. In this case, the information acquisition unit 261 acquires the radio resource information included in the above system information.

Note that the radio resource may also be transmitted by individual signaling to the terminal device 200, instead of being transmitted as part of the system information. Also, the radio resource information may also be stored in advance in the terminal device 200 (storage unit 230), without being transmitted by the base station 100.

(Terminal Device 200: Communication Control Unit 263)

Control Related to Transmission of Discovery Signal

Particularly, in the third modification, the communication control unit 263 controls the transmission of information to be reported so that the information to be reported is transmitted in a predetermined radio resource after the transmission of a discovery signal.

First Provision Accounting for Collisions Between Terminal Devices

For example, a discovery signal includes a signal sequence common among terminal devices 200. Additionally, the communication control unit 263 controls the transmission of information to be reported so that the information to be reported is transmitted in one of the radio resources from among the predetermined radio resources after the transmission of a discovery signal.

As a specific example, referring again to FIG. 15, the terminal device 200, according to control by the communication control unit 263, transmits a discovery signal in the radio resource 41, and after that, transmits information to be reported in one of the radio resources 43A to 43J. As one example, the terminal device 200 transmits the information to be reported in the radio resource 43A.

Note that another terminal device 200 likewise may transmit a discovery signal in the radio resource 41, and after that, transmit information to be reported in one of the radio resources 43A to 43J. In this case, both the terminal device 200 and the other terminal device 200 transmit a discovery signal in the same radio resource 41, but a discovery signal is detected appropriately by the terminal device 200 on the receiving side. The reason for this is because the sequence in the discovery signal is common among the terminal devices 200, and thus even if discovery signals collide, the correlator suitably detects a discovery signal similarly to the detection of a reflected wave. As another example, the other terminal device 200 transmits information to be reported in a radio resource other than the radio resource 43A from among the radio resources 43A to 43J. Thus, the information to be reported that is transmitted by the terminal device 200 and the information to be reported that is transmitted by the other terminal device 200 are both received and acquired appropriately by the terminal device 200 on the receiving side.

For example, in this way, the discovery signal includes a signal sequence common among the terminal devices 200, and information to be reported is transmitted in one of the radio resources from among the predetermined radio resources. Consequently, for example, even if multiple terminal devices 200 transmit a discovery signal and information to be reported, the terminal device on the receiving side becomes able to detect the discovery signals appropriately, and in addition, there is a higher likelihood of the information to be reported being received and acquired appropriately by the terminal device on the receiving side.

Second Provision Accounting for Collisions Between Terminal Devices

Even if a predetermined plurality of radio resources is prepared as discussed above, there is still a possibility of two or more terminal devices 200 transmitting information to be reported in the same radio resource (for example, in the radio resource 43A illustrated in FIG. 15).

Accordingly, for example, the communication control unit 263 controls the transmission of information to be reported so that every time a discovery signal is transmitted, the radio resource in which the information to be reported is transmitted changes from one radio resource among the predetermined radio resources to another radio resource among the predetermined radio resources.

As a specific example, referring again to FIG. 15, in a radio frame for transmitting a discovery signal, the terminal device 200, according to control by the communication control unit 263, transmits a discovery signal in the radio resource 41, and after that, transmits information to be reported in the radio resource 43A. Subsequently, in the next radio frame for transmitting a discovery signal, the terminal device 200, according to control by the communication control unit 263, additionally transmits a discovery signal in the radio resource 41, and after that, transmits information to be reported in one of the radio resources 43B to 43J.

Note that the communication control unit 263 is able to change the radio resource in which the information to be reported is transmitted by selecting the ith radio resource from among the predetermined radio resources as the radio resource according to the following formula.

$$i = \mathrm{mod}(x \times y, z) \quad \text{[Math. 1]}$$

Herein, x is the SFN of the radio frame in which the discovery signal is transmitted, and y is an ID of the terminal device 200 (such as a unique ID in the subscriber identification module (SIM), or a cell-radio network temporary identifier (C-RNTI), for example). Also, z is the number of radio resources in the predetermined radio resources. Note that the communication control unit 263 may also select the radio resource in which the information to be reported is transmitted by using a random number or the like instead of the above formula.

Consequently, for example, the possibility of two or more terminal devices 200 transmitting information to be reported in the same radio resource may be reduced.

Control Related to Detection of Discovery Signal

Particularly, in the third modification, the communication control unit 263, after the detection of a discovery signal, acquires information received in a predetermined radio resource for transmitting information to be reported after the transmission of a discovery signal.

For example, the communication control unit 263, after the detection of a discovery signal, acquires information received in each of predetermined radio resources for transmitting information to be reported after the transmission of a discovery signal.

As a specific example, referring again to FIG. 15, the terminal device 200, according to control by the communication control unit 263, conducts the detection process on a signal transmitted in the radio resource 41, and detects a discovery signal. Subsequently, the communication control unit 263 acquires information received in each of the radio resources 43A to 43J. For example, the information received in one of the radio resources 43A to 43J is information to be reported from another terminal device 200 that transmitted a discovery signal. For this reason, the communication control unit 263 acquires the information to be reported.

(Process Flow: Communication Control Process on Base Station Side)

Figure 16:
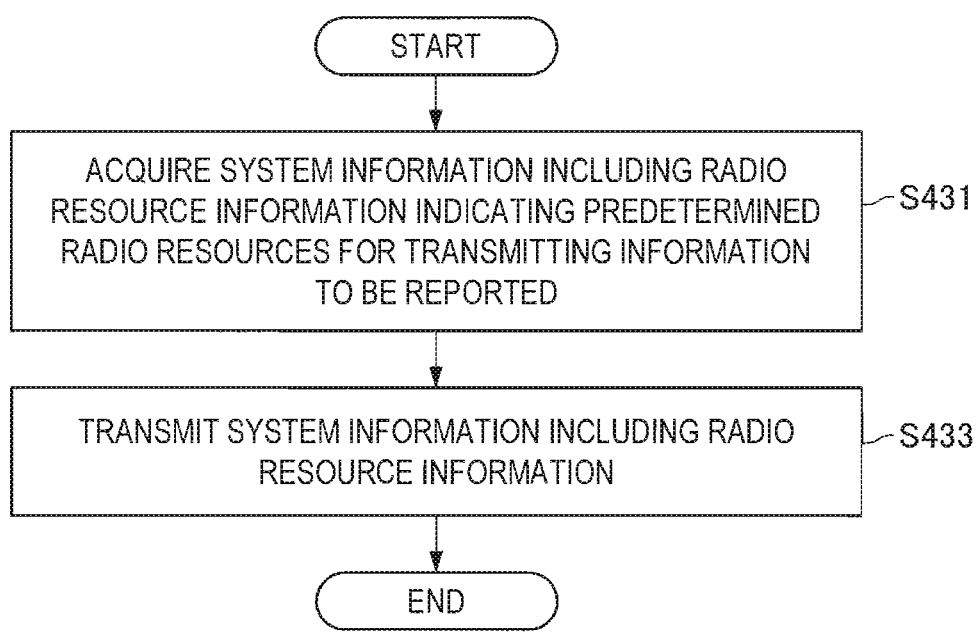
FIG. 16 is a flowchart illustrating an example of a schematic flow of a communication control process on the base station side according to a third modification of an embodiment of the present disclosure.

FIG. 16 is a flowchart illustrating an example of a schematic flow of a communication control process on the base station side according to a third modification of an embodiment of the present disclosure.

First, the information acquisition unit 151 acquires system information including radio resource information indicating predetermined radio resources for transmitting information to be reported after the transmission of a discovery signal (S431).

Subsequently, the base station 100, according to control by the communication control unit 153, transmits the system information including the radio resource information (S433). The process then ends.

Note that the communication control process discussed above is conducted every time the system information is transmitted.

(First Communication Control Process on Terminal Device Side: Transmission of Discovery Signal and the Like)

Figure 17:
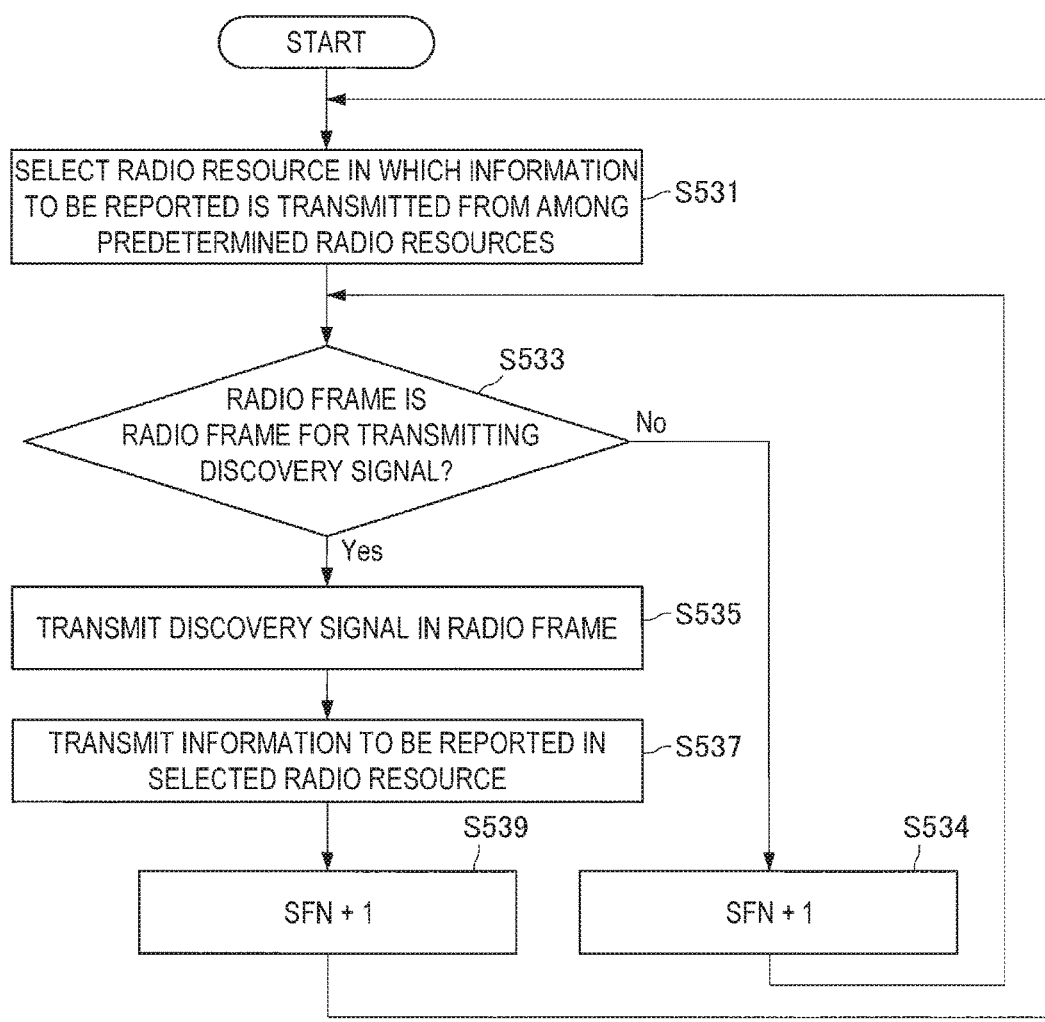
FIG. 17 is a flowchart illustrating an example of a schematic flow of a first communication control process on the terminal device side according to a third modification of an embodiment of the present disclosure.

FIG. 17 is a flowchart illustrating an example of a schematic flow of a first communication control process on the terminal device side according to a third modification of an embodiment of the present disclosure. The first communication control process is conducted when the terminal device 200 transmits a discovery signal and information to be reported.

First, the communication control unit 263 selects, from among the predetermined radio resources, a radio frame in which information to be reported is transmitted (S531).

Subsequently, if the radio frame is not a radio frame for transmitting a discovery signal (S533; No), a discovery signal is not transmitted. Subsequently, the system frame number is incremented (S534), and the process returns to step S533.

On the other hand, if the radio frame is a radio frame for transmitting a discovery signal (S533; Yes), the terminal device 200, according to control by the communication control unit 263, transmits a discovery signal in the radio frame (S535). Furthermore, the terminal device 200, according to control by the communication control unit 263, transmits information to be reported in the selected radio resource (S537). Subsequently, the system frame number is incremented (S539), and the process returns to step S531.

(Second Communication Control Process on Terminal Device Side: Acquisition of Information to be Reported)

Figure 18:
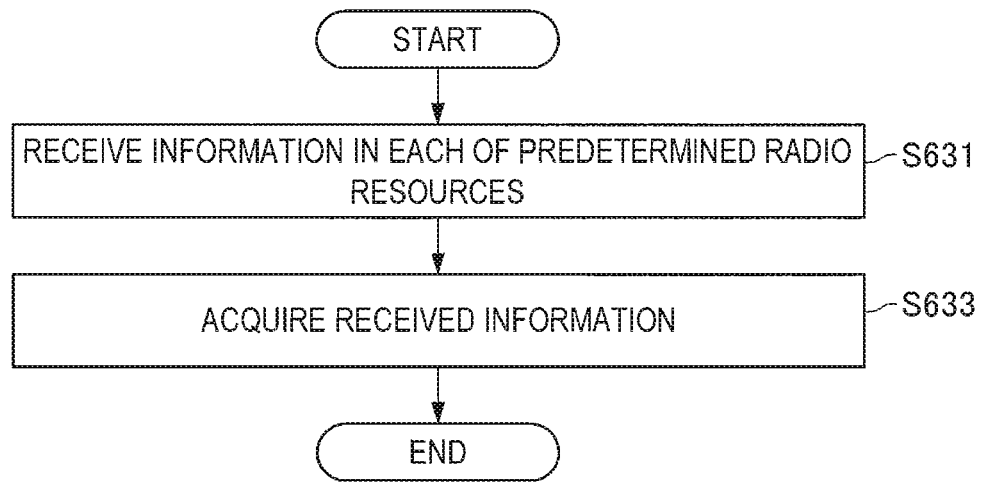
FIG. 18 is a flowchart illustrating an example of a schematic flow of a second communication control process on the terminal device side according to a third modification of an embodiment of the present disclosure.

FIG. 18 is a flowchart illustrating an example of a schematic flow of a second communication control process on the terminal device side according to a third modification of an embodiment of the present disclosure. The second communication control process is conducted after the terminal device 200 detects a discovery signal.

First, the terminal device 200 receives information in each of predetermined radio resources (S631).

Subsequently, the communication control unit 263 acquires the information received in each of the predetermined radio resources (S633). The process then ends.

<5.4. Fourth Modification>

Next, a fourth modification of an embodiment of the present disclosure will be described with reference to FIG. 19.

(Summary)

In the fourth modification, if individual transmission information related to radio frames for transmitting a discovery signal by a terminal device 200 is transmitted by each of one or more terminal devices 200 positioned within an area, the base station 100 acquires the individual transmission information. Subsequently, the base station 100 transmits aggregate transmission information related to radio frames for transmitting a discovery signal by the one or more terminal devices 200.

Consequently, for example, when a terminal device 200 positioned within an area conducts the detection process for detecting a discovery signal, it becomes possible to conduct the detection process in the necessary and sufficient radio frames. For this reason, it becomes possible to moderate the load on the terminal device 200.

Specifically, for example, when none of the terminal devices 200 positioned within an area is transmitting a discovery signal for a collision warning, conducting the detection process in a radio frame for transmitting a discovery signal for a collision warning is wasteful for a terminal device 200 conducting the detection process within that area. Accordingly, by transmitting the aggregate transmission information to the terminal device 200, the terminal device 200 becomes able to identify the necessary and sufficient radio frames in which the detection process is conducted. For this reason, the load on the terminal device 200 may be moderated.

Also, in the fourth modification, if individual detection information related to radio frames for conducting a detection process for detecting a discovery signal by a terminal device 200 is transmitted by each of one or more terminal devices 200 positioned within an area, the base station 100 acquires the individual detection information. Subsequently, the base station 100 transmits aggregate detection information related to radio frames for conducting the detection process by the one or more terminal devices 200.

Consequently, for example, when a terminal device 200 positioned within an area transmits a discovery signal, it becomes possible to transmit the discovery signal in the necessary and sufficient radio frames. For this reason, it becomes possible to moderate the load on the terminal device 200.

Specifically, for example, when none of the terminal devices 200 positioned within an area is detecting a discovery signal for a collision warning, transmitting a discovery signal in a radio frame for transmitting a discovery signal for a collision warning is wasteful for a terminal device 200 transmitting a discovery signal within that area. Accordingly, by transmitting the aggregate detection information to the terminal device 200, the terminal device 200 becomes able to identify the necessary and sufficient radio frames in which a discovery signal is transmitted. For this reason, the load on the terminal device 200 may be moderated.

(Base Station 100: Information Acquisition Unit 151)

Individual Transmission Information

Particularly, in the fourth modification, for example, if individual transmission information related to radio frames for transmitting a discovery signal by a terminal device 200 is transmitted by each of one or more terminal devices 200 positioned within an area, the information acquisition unit 151 acquires the individual transmission information.

The area is the coverage (that is, the cell 10) of the base station 100, for example. Note that the area may also be a smaller area included in the coverage (such as one from among multiple sectors included in the cell 10, or an area corresponding to a beam formed by beamforming, for example).

For example, the radio frame in which a discovery signal is transmitted is predefined for each purpose of D2D communication. In this case, for example, the individual transmission information is information indicating the purpose of D2D communication for the terminal device 200. Consequently, which radio frames may be used to transmit a discovery signal by the terminal device 200 that transmitted the individual transmission information may be ascertained from the individual transmission information.

Note that the individual transmission information is not limited to information indicating the purpose of D2D communication for the terminal device 200, and may also be other information. For example, the individual transmission information may also be information indicating a cycle of transmission of a discovery signal by the terminal device 200. Consequently, what kind of cycle on which a discovery signal may be transmitted by the terminal device 200 that transmitted the individual transmission information may be ascertained from the individual transmission information, and as a result, which radio frames may be used to transmit a discovery signal by the terminal device 200 that transmitted the individual transmission information may be ascertained.

Individual Detection Information

Also, particularly in the fourth modification, for example, if individual detection information related to radio frames for conducting a detection process for detecting a discovery signal by a terminal device 200 is transmitted by each of one or more terminal devices 200 positioned within an area, the information acquisition unit 151 acquires the individual detection information.

As discussed above in relation to the individual transmission information, the area is the coverage (that is, the cell 10) of the base station 100, for example. Note that the area may also be a smaller area included in the coverage.

For example, the radio frame in which a discovery signal is transmitted is predefined for each purpose of D2D communication. In this case, the individual detection information is information indicating the purpose of D2D communication for the terminal device 200, for example. Consequently, which radio frames may be used to conduct the detection process by the terminal device 200 that transmitted the individual detection information may be ascertained from the individual detection information.

Note that the individual detection information is not limited to information indicating the purpose of D2D communication for the terminal device 200, and may also be other information. For example, the individual detection information may also be information indicating a cycle of the detection process by the terminal device 200. Consequently, what kind of cycle on which the detection process may be conducted by the terminal device 200 that transmitted the individual detection information may be ascertained from the individual detection information, and as a result, which radio frames may be used to conduct the detection process by the terminal device 200 that transmitted the individual detection information may be ascertained.

(Base Station 100: Communication Control Unit 153)

Control Related to Transmission of Aggregate Transmission Information

Particularly, in the fourth modification, the communication control unit 153 controls the transmission of aggregate transmission information related to radio frames for transmitting a discovery signal by one or more terminal devices 200 that provide the individual transmission information.

The aggregate transmission information is formed by aggregating information indicated by individual transmission information provided by the one or more terminal devices 200, for example. Subsequently, the generated aggregate transmission information is transmitted to terminal devices 200 within the area, according to control by the communication control unit 153.

For example, the radio frame in which a discovery signal is transmitted is predefined for each purpose of D2D communication. In this case, for example, the aggregate transmission information is information indicating the purpose of D2D communication for the one or more terminal devices 200. Consequently, which radio frames may be used to transmit a discovery signal by the one or more terminal devices 200 positioned within the area may be ascertained from the aggregate transmission information.

Note that the aggregate transmission information is not limited to information indicating the purpose of D2D communication for the terminal device 200, and may also be other information. For example, the aggregate transmission information may also be information indicating a cycle of transmission of a discovery signal by the one or more terminal devices 200 within the area. Consequently, what kind of cycle on which a discovery signal may be transmitted by the one or more terminal devices 200 positioned within the area may be ascertained from the aggregate transmission information, and as a result, which radio frames may be used to transmit a discovery signal by the one or more terminal devices 200 within the area may be ascertained.

Control Related to Transmission of Aggregate Detection Information

Also, particularly in the fourth modification, the communication control unit 153 controls the transmission of aggregate detection information related to radio frames for conducting the detection process by one or more terminal devices 200 that provide the individual detection information.

The aggregate detection information is generated by aggregating information indicated by individual detection information provided by the one or more terminal devices 200, for example. Subsequently, the generated aggregate detection information is transmitted to terminal devices 200 within the area, according to control by the communication control unit 153.

For example, the radio frame in which a discovery signal is transmitted is predefined for each purpose of D2D communication. In this case, for example, the aggregate detection information is information indicating the purpose of D2D communication for the one or more terminal devices 200. Consequently, which radio frames may be used to conduct the detection process by the one or more terminal devices 200 positioned within the area may be ascertained from the aggregate detection information.

Note that the aggregate detection information is not limited to information indicating the purpose of D2D communication for the terminal device 200, and may also be other information. For example, the aggregate detection information may also be information indicating a cycle of the detection process by the one or more terminal devices 200 within the area. Consequently, what kind of cycle on which the detection process may be conducted by the one or more terminal devices 200 positioned within the area may be ascertained from the aggregate detection information, and as a result, which radio frames may be used to conduct the detection process by the one or more terminal devices 200 within the area may be ascertained.

(Terminal Device 200: Information Acquisition Unit 261)

Individual Transmission Information

Particularly, in the fourth embodiment, for example, the information acquisition unit 261 acquires individual transmission information related to radio frames for transmitting a discovery signal by a terminal device 200. For example, the individual transmission information is stored in advance in the storage unit 230. Subsequently, the information acquisition unit 261 acquires the individual transmission information from the storage unit 230.

Individual Detection Information

Also, particularly in the fourth embodiment, for example, the information acquisition unit 261 acquires individual detection information related to radio frames for conducting a detection process for detecting a discovery signal by a terminal device 200. For example, the individual detection information is stored in advance in the storage unit 230. Subsequently, the information acquisition unit 261 acquires the individual detection information from the storage unit 230.

Aggregate Transmission Information

Also, particularly in the fourth embodiment, for example, the information acquisition unit 261 acquires aggregate transmission information related to radio frames for transmitting a discovery signal by one or more terminal devices 200 positioned within an area. For example, the aggregate transmission information is transmitted by the base station 100, and received by the terminal device 200. Subsequently, the information acquisition unit 261 acquires the received aggregate transmission information.

Aggregate Detection Information

Also, particularly in the fourth embodiment, for example, the information acquisition unit 261 acquires aggregate detection information related to radio frames for conducting the detection process by one or more terminal devices 200 positioned within an area. For example, the aggregate detection information is transmitted by the base station 100, and received by the terminal device 200. Subsequently, the information acquisition unit 261 acquires the received aggregate detection information.

(Terminal Device 200: Communication Control Unit 263)
Control Related to Transmission of Discovery
Transmission of Individual Transmission Information Particularly, in the fourth embodiment, for example, the communication control unit 263 controls the transmission of the individual transmission information to the base station 100.

For example, the communication control unit 263 maps a signal of information including the individual transmission information onto an uplink radio resource allocated to the terminal device 200. Consequently, the individual transmission information is transmitted to the base station 100.

Transmission of Discovery Signal Based on Aggregate Detection Information

Particularly, in the fourth embodiment, the communication control unit 263 controls the transmission of a discovery signal on the basis of the aggregate detection information.

For example, from the aggregate detection information, the communication control unit 263 knows the radio frames for conducting the detection process by the one or more terminal devices 200 positioned within the area. Additionally, the communication control unit 263 sets a radio frame for conducting the detection process by the one or more terminal devices 200 from among the radio frames for transmitting a discovery signal by the terminal device 200 as the radio frame in which the terminal device 200 will actually transmit the discovery signal. After that, the terminal device 200 transmits the discovery signal in the set radio frame, and does not transmit a discovery signal in other radio frames.

As an example, the purposes of D2D communication for the terminal device 200 include a first purpose (for example, a collision warning) and a second purpose (for example, a fire alert). In addition, the aggregate detection information indicates that the purpose of D2D communication for any one of the one or more terminal devices 200 does not include the first purpose, whereas the purpose of D2D communication for any one of the one or more terminal devices 200 includes the second purpose. In this case, the communication control unit 263 sets the radio frame for transmitting a discovery signal for D2D communication with the purpose of the second purpose as the radio frame in which the terminal device 200 will actually transmit the discovery signal. After that, the terminal device 200 transmits the discovery signal in the set radio frame. In other words, the terminal device 200 transmits a discovery signal in the radio frame corresponding to the second purpose, and does not transmit a discovery signal in other radio frames (such as a radio frame corresponding to the first purpose and not corresponding to the second purpose, for example).

Control Related to Detection of Discovery Signal
Transmission of Individual Detection Information Particularly, in the fourth embodiment, for example, the communication control unit 263 controls the transmission of the individual detection information to the base station 100.

For example, the communication control unit 263 maps a signal of information including the individual detection information onto an uplink radio resource allocated to the terminal device 200. Consequently, the individual detection information is transmitted to the base station 100.

Detection of Discovery Signal Based on Aggregate Transmission Information

Particularly, in the fourth embodiment, the communication control unit 263 controls the detection process for detecting a discovery signal, on the basis of the aggregate transmission information.

For example, from the aggregate transmission information, the communication control unit 263 knows the radio frames for transmitting a discovery signal by the one or more terminal devices 200 positioned within the area. Additionally, the communication control unit 263 sets a radio frame for transmitting a discovery signal by the one or more terminal devices 200 from among the radio frames for conducting the detection process by the terminal device 200 as the radio frame in which the terminal device 200 will actually conduct the detection process. After that, the terminal device 200 conducts the detection process in the set radio frame, and does not conduct the detection process in other radio frames.

As an example, the purposes of D2D communication for the terminal device 200 include a first purpose (for example, a collision warning) and a second purpose (for example, a fire alert). In addition, the aggregate transmission information indicates that the purpose of D2D communication for any one of the one or more terminal devices 200 does not include the first purpose, whereas the purpose of D2D communication for any one of the one or more terminal devices 200 includes the second purpose. In this case, the communication control unit 263 sets the radio frame for transmitting a discovery signal for D2D communication with the purpose of the second purpose as the radio frame in which the terminal device 200 will actually conduct the detection process. After that, the terminal device 200 conducts the detection process in the set radio frame. In other words, the terminal device 200 conducts the detection process in the radio frame corresponding to the second purpose, and does not conduct the detection process in other radio frames (such as a radio frame corresponding to the first purpose and not corresponding to the second purpose, for example).

(Process Flow)

Figure 19:
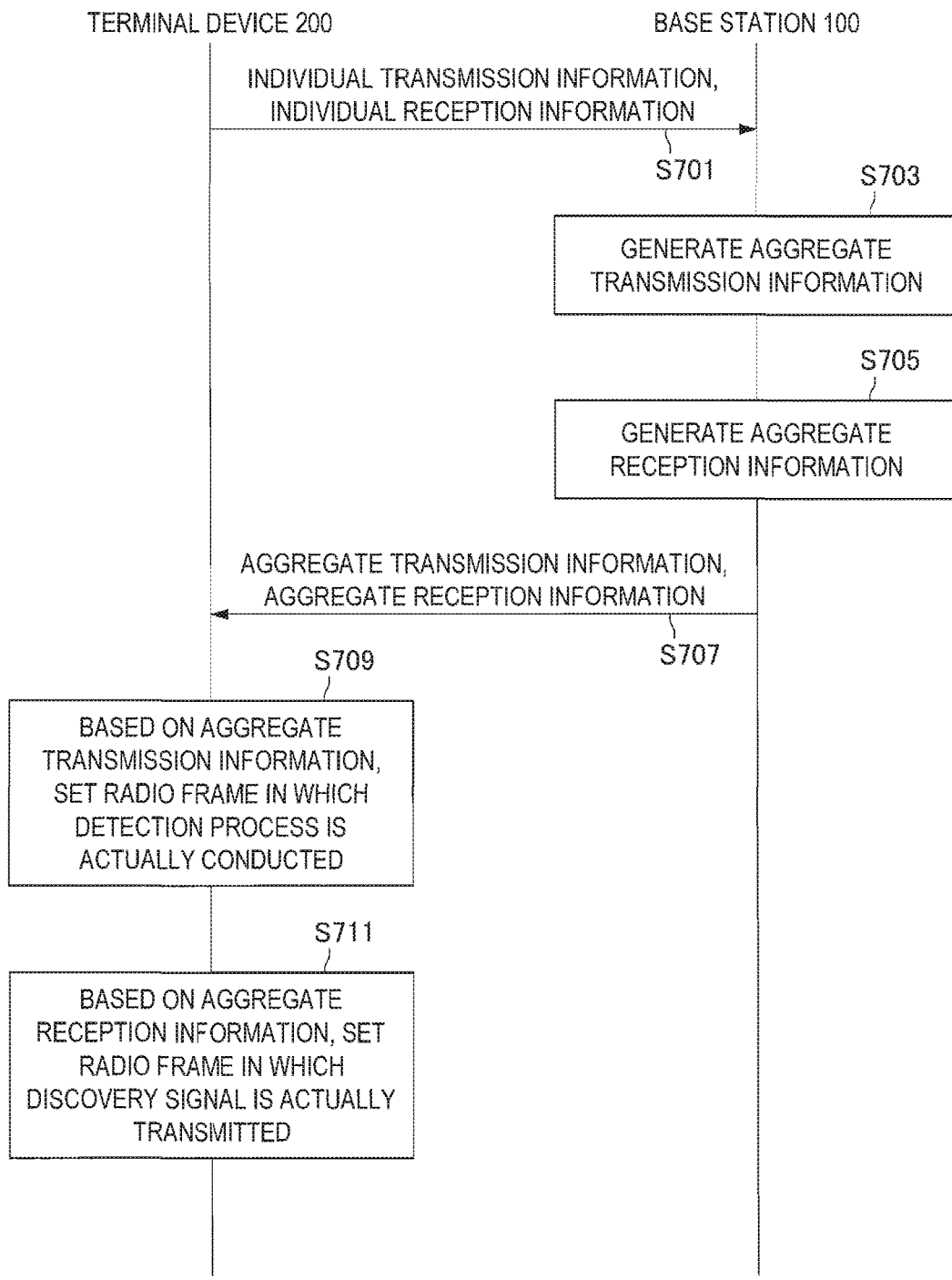
FIG. 19 is a sequence diagram illustrating an example of a schematic flow of a communication control process according to a fourth modification of an embodiment of the present disclosure.

FIG. 19 is a sequence diagram illustrating an example of a schematic flow of a communication control process according to a fourth modification of an embodiment of the present disclosure.

The terminal device 200 transmits, to the base station 100, individual transmission information related to radio frames for transmitting a discovery signal by the terminal device 200, and individual detection information related to radio frames for conducting a detection process for detecting a discovery signal by the terminal device 200 (S701). Subsequently, the base station 100 acquires the individual detection information.

Subsequently, the base station 100, on the basis of the individual transmission information transmitted by one or more terminal devices 200 positioned within the area, generates aggregate transmission information related to radio frames for transmitting a discovery signal by the one or more terminal devices 200 (S703). Also, the base station 100, on the basis of the individual detection information transmitted by one or more terminal devices 200 positioned within the area, generates aggregate detection information related to radio frames for conducting the detection process by the one or more terminal devices 200 (S705). Subsequently, the base station 100 transmits the aggregate transmission information and the aggregate detection information to the terminal device 200 (S707).

After that, the terminal device 200, on the basis of the aggregate transmission information, sets the radio frame in which the terminal device 200 will actually conduct the detection process (S709). After that, the terminal device 200 conducts the detection process in the set radio frame. Also, the terminal device 200, on the basis of the aggregate detection information, sets the radio frame in which the terminal device 200 will actually transmit a discovery signal (S711). After that, the terminal device 200 transmits the discovery signal in the set radio frame.

<5.5. Fifth Modification>

Next, a fifth modification of an embodiment of the present disclosure will be described with reference to FIGS. 20 to 22.

(Summary)

In the fifth modification, when the mode of the terminal device 200 is a connected mode, the terminal device 200 conducts a detection process for detecting a discovery signal at a first frequency of repetition, whereas when the mode of the terminal device 200 is an idle mode, the terminal device 200 conducts the detection process at a second frequency of repetition lower than the first frequency of repetition.

Consequently, it becomes possible to moderate the load on a terminal device 200 in idle mode, for example. Specifically, for example, in idle mode, the frequency of repetition of the detection process by the terminal device 200 becomes lower, making it possible to moderate power consumption in the terminal device 200.

(Terminal Device 200: Communication Control Unit 263)

Particularly, in the fifth modification, the communication control unit 263 controls a detection process for detecting a discovery signal so that when the mode of the terminal device 200 is a connected mode, the detection process is conducted at a first frequency of repetition. Also, the communication control unit 263 controls the detection process so that when the mode of the terminal device 200 is an idle mode, the detection process is conducted at a second frequency of repetition lower than the first frequency of repetition. For example, the connected mode is the Radio Resource Control (RRC) mode, while the idle mode is the RRC idle mode. Hereinafter, a specific example of the frequency of repetition of the detection process in connected mode and idle mode will be described with reference to FIG. 20.

Figure 20:
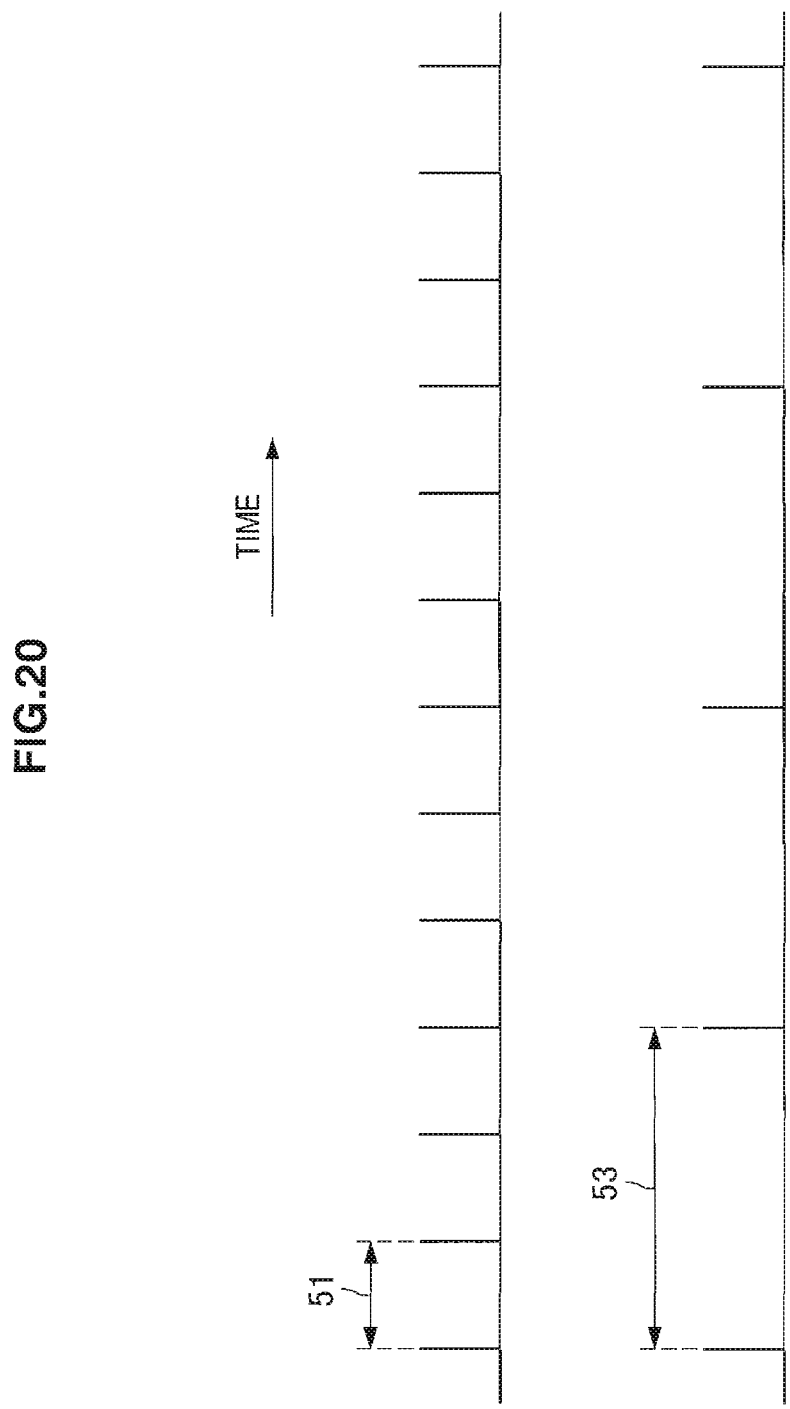
FIG. 20 is an explanatory diagram for illustrating an example of the frequency of repetition of a detection process in a connected mode and an idle mode.

FIG. 20 is an explanatory diagram for illustrating an example of the frequency of repetition of a detection process in connected mode and idle mode. Referring to FIG. 20, when the mode of the terminal device 200 is connected mode, the terminal device 200 conducts a detection process for detecting a discovery signal on a connected mode cycle 51. The connected mode cycle 51 is 100 ms, for example. On the other hand, when the mode of the terminal device 200 is idle mode, the terminal device 200 conducts a detection process for detecting a discovery signal on an idle mode cycle 53. The idle mode cycle 53 is longer than the cycle 51, and is 300 ms, for example. In this way, in the case in which the mode of the terminal device 200 is idle mode, the frequency of repetition of the detection process is lower than in the case in which the mode of the terminal device 200 is connected mode.

Note that the communication control unit 263 may also control the detection process so that when the mode is idle mode, the detection process is conducted at a third frequency of repetition if the terminal device 200 is positioned inside the coverage of the base station 100, and the detection process is conducted at a fourth frequency of repetition lower than the third frequency of repetition if the terminal device 200 is positioned outside the coverage. Hereinafter, a specific example regarding this point will be described with reference to FIG. 21.

Figure 21:
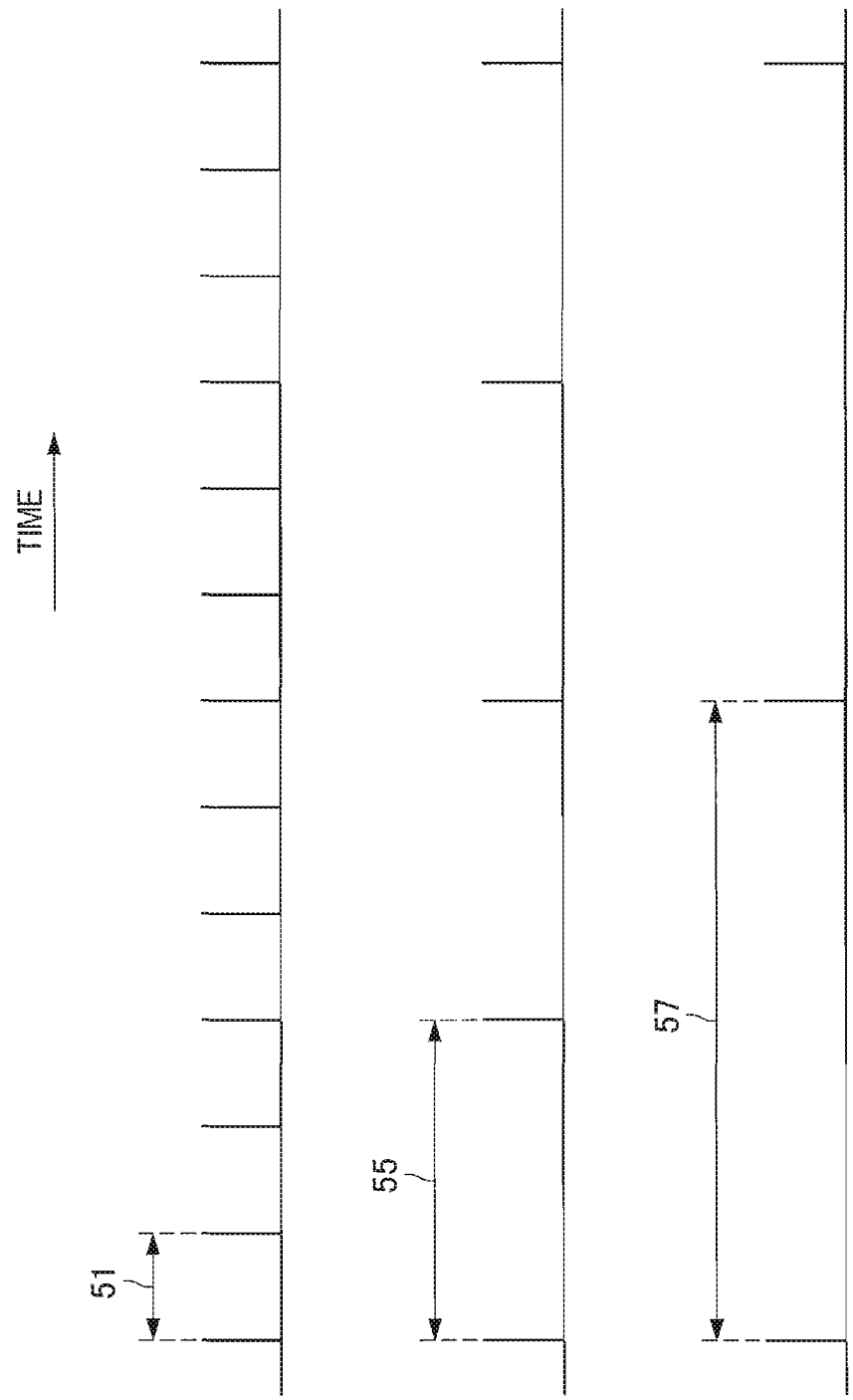
FIG. 21 is an explanatory diagram for illustrating an example of an in-coverage detection process and the frequency of repetition of the in-coverage detection process.

FIG. 21 is an explanatory diagram for illustrating an example of an in-coverage detection process and the frequency of repetition of the in-coverage detection process.

Referring to FIG. 21, when the mode of the terminal device 200 is connected mode, the terminal device 200 conducts a detection process for detecting a discovery signal on a connected mode cycle 51. As discussed above, the connected mode cycle 51 is 100 ms, for example. Also, when the mode of the terminal device 200 is idle mode, the terminal device 200 conducts the detection process on a first idle mode cycle 55 if the terminal device 200 is positioned inside the coverage of the base station 100. The first idle mode cycle 55 is longer than the connected mode cycle 51, and is 300 ms, for example. Also, when the mode of the terminal device 200 is idle mode, the terminal device 200 conducts the detection process on a second idle mode cycle 57 if the terminal device 200 is positioned outside the coverage of the base station 100. The second idle mode cycle 57 is longer than the first idle mode cycle 55, and is 600 ms, for example. When the mode of the terminal device 200 is idle mode, the frequency of repetition of the detection process is lower in the case in which the terminal device 200 is positioned outside the coverage of the base station 100 than in the case in which the terminal device 200 is positioned inside the coverage of the base station 100.

Consequently, for example, it becomes possible to further moderate the load on a terminal device 200 positioned outside the coverage of the base station 100. Specifically, for example, when the terminal device 200 is positioned outside the coverage of the base station 100, the frequency of repetition of the detection process by the terminal device 200 becomes particularly lower, making it possible to moderate power consumption in the terminal device 200 positioned outside the coverage of the base station 100. Since the number of terminal devices 200 outside the coverage of the base station 100 is also low, the possibility of a discovery signal being transmitted is lower. For this reason, lowering the frequency of repetition of the detection process outside the coverage as described above is effective.

(Process Flow)

Figure 22:
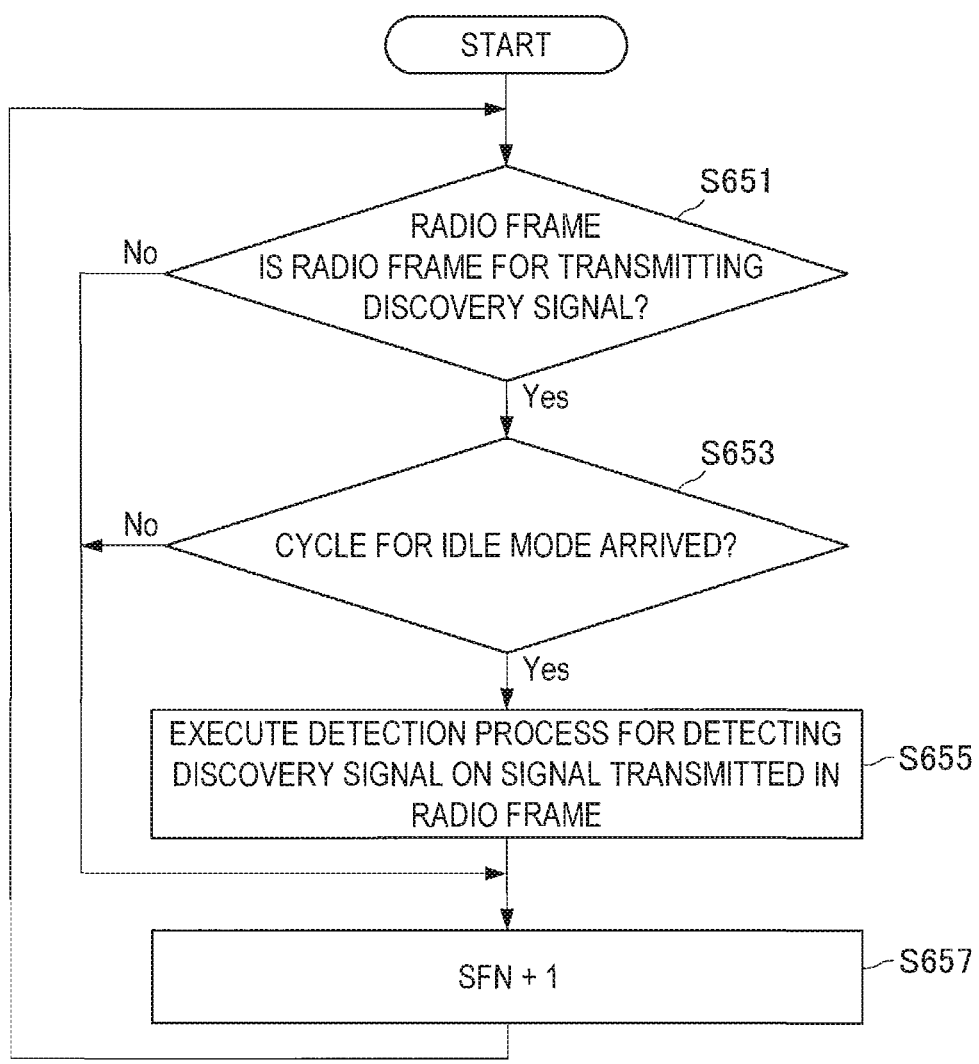
FIG. 22 is a flowchart illustrating an example of a schematic flow of a communication control process on the terminal device side according to a fifth modification of an embodiment of the present disclosure.

FIG. 22 is a flowchart illustrating an example of a schematic flow of a communication control process on the terminal device side according to a fifth modification of an embodiment of the present disclosure. The communication control process is conducted when the terminal device 200 in idle mode conducts the detection process for detecting a discovery signal.

When the radio frame is a radio frame for transmitting a discovery signal (S651: Yes), and a cycle for idle mode arrives (S653: Yes), the terminal device 200, according to control by the communication control unit 263, conducts the detection process for detecting a discovery signal on the signal transmitted in the radio frame (S655). Subsequently, the system frame number is incremented (S657), and the process is repeated.

On the other hand, if the radio frame is not a radio frame for transmitting a discovery signal (S651: No), or if a cycle for idle mode does not arrive (S653: No), the detection process is not conducted on the signal transmitted in the radio frame. Subsequently, the system frame number is incremented (S657), and the process is repeated.

<<6. Applications>>

Technology according to the present disclosure is applicable to various products. For example, the base station 100 may be realized as an evolved Node B (eNB) of any type, such as a macro eNB or a small eNB. A small eNB may be an eNB that covers a cell smaller than a macro cell, such as a pico eNB, micro eNB, or home (femto) eNB. Conversely, the base station 100 may also be realized as another type of base station, such as a NodeB or a base transceiver station (BTS). The base station 100 may also include a main unit that controls radio communication (also called a base station device), and one or more remote radio heads (RRHs) placed in a location separate from the main unit. Additionally, various types of terminals to be discussed later may also operate as the base station 100 by temporarily or semi-permanently executing a base station function.

In addition, the terminal device 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the terminal device 200 may also be realized as a terminal that conducts machine-to-machine (M2M) communication (also called a machine-type communication (MTC) terminal). Furthermore, the terminal device 200 may be a radio communication module mounted onboard these terminals (for example, an integrated circuit module configured on a single die).

<6.1. Applications Related to Base Station>

(First Application)

Figure 23:
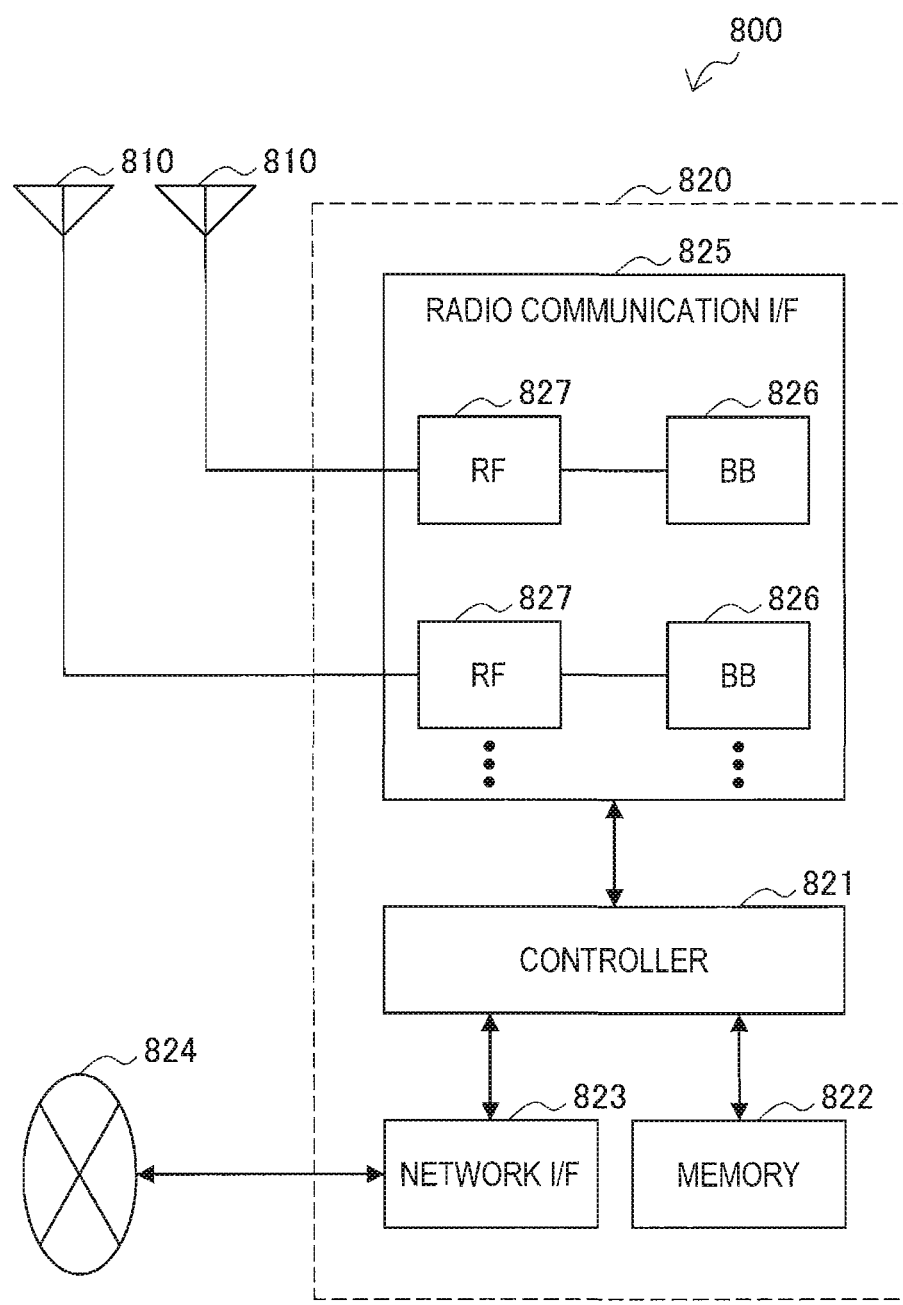
FIG. 23 is a block diagram illustrating a first example of a schematic configuration of an eNB to which technology according to an embodiment of the present disclosure may be applied.

FIG. 23 is a block diagram illustrating a first example of a schematic configuration of an eNB to which technology according to an embodiment of the present disclosure may be applied. An eNB 800 includes one or more antennas 810, and a base station device 820. The respective antennas 810 and the base station device 820 may be connected to each other via an RF cable.

Each antenna 810 includes a single or multiple antenna elements (for example, multiple antenna elements constituting a MIMO antenna), and is used by the base station device 820 to transmit and receive radio signals. The eNB 800 may include multiple antennas 810 as illustrated in FIG. 23, and the multiple antennas 810 may respectively correspond to multiple frequency bands used by the eNB 800, for example. Note that although FIG. 23 illustrates an example of the eNB 800 including multiple antennas 810, the eNB 800 may also include a single antenna 810.

The base station device 820 is equipped with a controller 821, memory 822, a network interface 823, and a radio communication interface 825.

The controller 821 may be a CPU or DSP, for example, and causes various higher-layer functions of the base station device 820 to operate. For example, the controller 821 generates a data packet from data inside a signal processed by the radio communication interface 825, and forwards the generated packet via the network interface 823. The controller 821 may also generate a bundled packet by bundling data from multiple baseband processors, and forward the generated bundled packet. In addition, the controller 821 may also include logical functions that execute controls such as Radio Resource Control (RRC), Radio Bearer control, mobility management, admission control, or scheduling. Also, such controls may also be executed in coordination with a nearby eNB or core network node. The memory 822 includes RAM and ROM, and stores programs executed by the controller 821 as well as various control data (such as a terminal list, transmit power data, and scheduling data, for example).

The network interface 823 is a communication interface for connecting the base station device 820 to a core network 824. The controller 821 may also communication with a core network node or another eNB via the network interface 823. In this case, the eNB 800 and the core network node or other eNB may be connected to each other by a logical interface (for example, the S1 interface or the X2 interface). The network interface 823 may also be a wired communication interface, or a wireless communication interface for wireless backhaul. In the case in which the network interface 823 is a wireless communication interface, the network interface 823 may use a higher frequency band for wireless communication than the frequency band used by the radio communication interface 825.

The radio communication interface 825 supports a cellular communication scheme such as Long Term Evolution (LTE) or LTE-Advanced, and provides a radio connection to a terminal positioned inside the cell of the eNB 800 via an antenna 810. Typically, the radio communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in respective layers (for example, L1, Medium Access Control (MAC), Radio Link Control (RLC), and Packet Data Convergence Protocol (PDCP)). The BB processor 826 may also include some or all of the logical functions discussed earlier instead of the controller 821. The BB processor 826 may be a module including memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amp, and transmits or receives a radio signal via an antenna 810.

The radio communication interface 825 may also include multiple BB processors 826 as illustrated in FIG. 23, and the multiple BB processors 826 may respectively correspond to multiple frequency bands used by the eNB 800, for example. In addition, the radio communication interface 825 may also include multiple RF circuits 827 as illustrated in FIG. 23, and the multiple RF circuits 827 may respectively correspond to multiple antenna elements, for example. Note that although FIG. 23 illustrates an example of the radio communication interface 825 including multiple BB processors 826 and multiple RF circuits 827, the radio communication interface 825 may also include a single BB processor 826 or a single RF circuit 827.

(Second Application)

Figure 24:
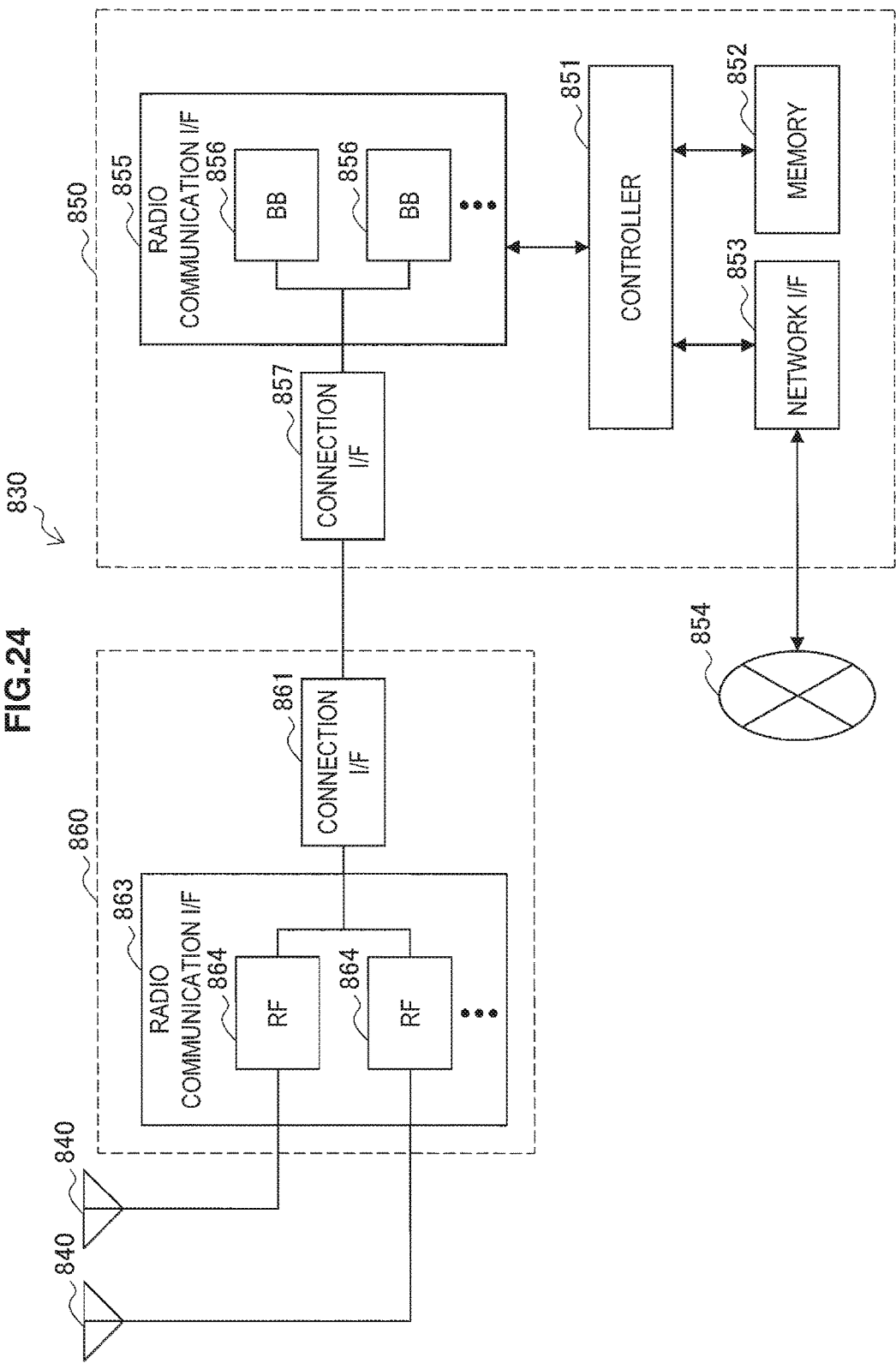
FIG. 24 is a block diagram illustrating a second example of a schematic configuration of an eNB to which technology according to an embodiment of the present disclosure may be applied.

FIG. 24 is a block diagram illustrating a second example of a schematic configuration of an eNB to which technology according to an embodiment of the present disclosure may be applied. An eNB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or multiple antenna elements (for example, multiple antenna elements constituting a MIMO antenna), and is used by the RRH 860 to transmit and receive radio signals. The eNB 830 may include multiple antennas 840 as illustrated in FIG. 24, and the multiple antennas 840 may respectively correspond to multiple frequency bands used by the eNB 830, for example. Note that although FIG. 24 illustrates an example of the eNB 830 including multiple antennas 840, the eNB 830 may also include a single antenna 840.

The base station device 850 is equipped with a controller 851, memory 852, a network interface 853, a radio communication interface 855, and a connection interface 857. The controller 851, the memory 852, and the network interface 853 are similar to the controller 821, the memory 822, and the network interface 823 described with reference to FIG. 23.

The radio communication interface 855 supports a cellular communication scheme such as LTE or LTE-Advanced, and provides a radio connection to a terminal positioned inside a sector corresponding to the RRH 860 via the RRH 860 and an antenna 840. Typically, the radio communication interface 855 may include a BB processor 856 and the like. The BB processor 856 is similar to the BB processor 826 described with reference to FIG. 23, except for being connected to an RF circuit 864 of the RRH 860 via the connection interface 857. The radio communication interface 855 may also include multiple BB processors 856 as illustrated in FIG. 24, and the multiple BB processors 856 may respectively correspond to multiple frequency bands used by the eNB 830, for example. Note that although FIG. 24 illustrates an example of the radio communication interface 855 including multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication on the high-speed link connecting the base station device 850 (radio communication interface 855) and the RRH 860.

In addition, the RRH 860 is equipped with a connection interface 861 and a radio communication interface 863.

The connection interface 861 is an interface for connecting the RRH 860 (radio communication interface 863) to the base station device 850. The connection interface 861 may also be a communication module for communication on the high-speed link.

The radio communication interface 863 transmits and receives a radio signal via an antenna 840. Typically, the radio communication interface 863 may include an RF circuit 864. The RF circuit 864 may include components such as a mixer, a filter, and an amp, and transmits or receives a radio signal via an antenna 840. The radio communication interface 863 may also include multiple RF circuits 864 as illustrated in FIG. 24, and the multiple RF circuits 864 may respectively correspond to multiple antenna elements, for example. Note that although FIG. 24 illustrates an example of the radio communication interface 863 including multiple RF circuits 864, the radio communication interface 863 may also include a single RF circuit 864.

In the eNB 800 and the eNB 830 illustrated in FIGS. 23 and 24, the information acquisition unit 151 and communication control unit 153 described with reference to FIG. 3 may be implemented in the radio communication interface 825 as well as the radio communication interface 855 and/or the radio communication interface 863. Also, at least some of these functions may also be implemented in the controller 821 and the controller 851.

Figure 25:
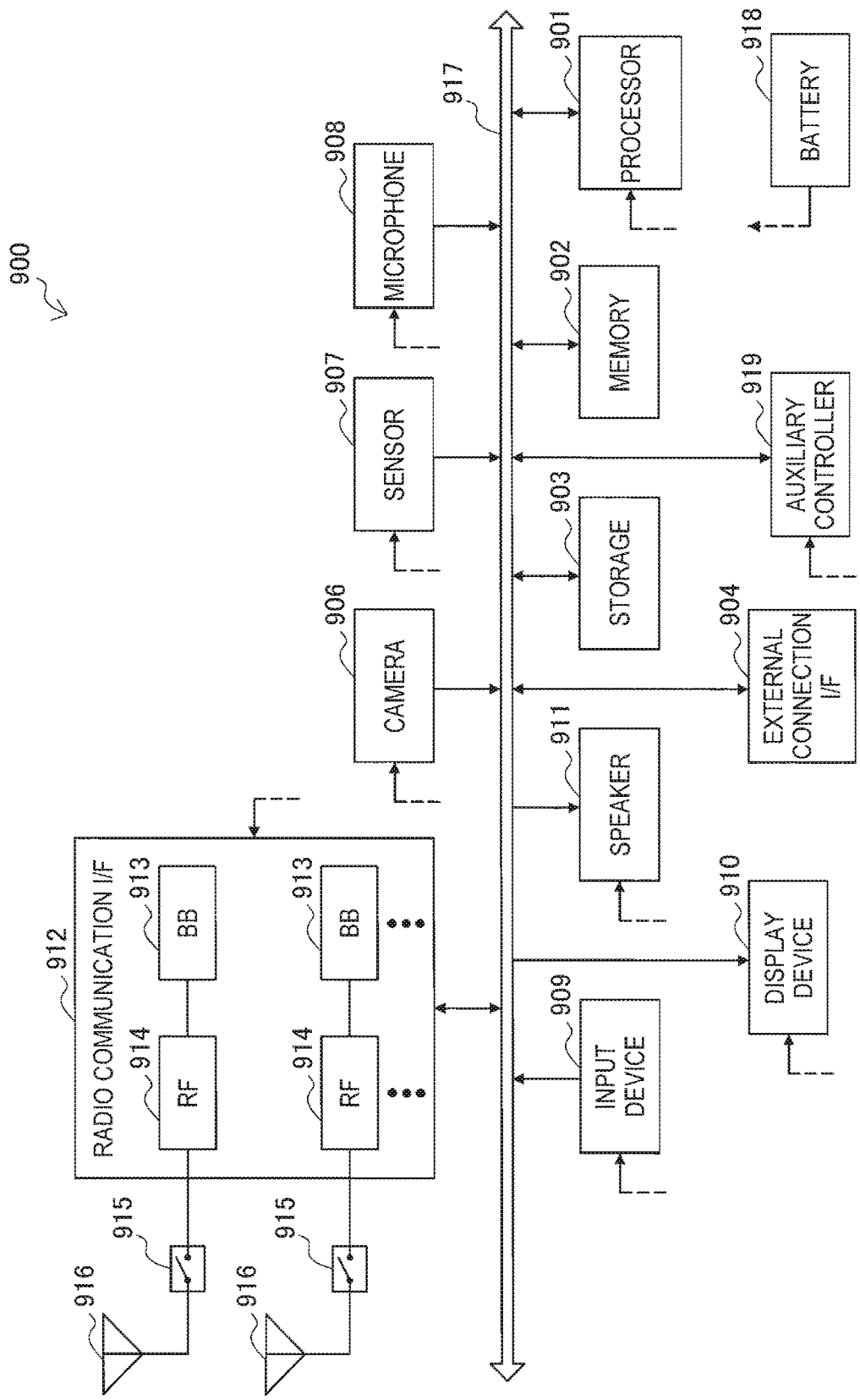
FIG. 25 is a block diagram illustrating an example of a schematic configuration of a smartphone to which technology according to an embodiment of the present disclosure may be applied.

<6.2. Applications Related to Terminal Device>
(First Application)
FIG. 25 is a block diagram illustrating an example of a schematic configuration of a smartphone 900 to which technology according to an embodiment of the present disclosure may be applied. The smartphone 900 is equipped with a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900.

The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The radio communication interface 912 supports a cellular communication scheme such as LTE or LTE-Advanced, and executes radio communication.

Typically, the radio communication interface 912 may include a BB processor 913, an RF circuit 914, and the like. The BB processor 913 may conduct processes such as encoding/decoding, modulation/demodulation, and multiplexing/demultiplexing, for example, and executes various signal processing for radio communication. Meanwhile, the RF circuit 914 may include components such as a mixer, a filter, and an amp, and transmits or receives a radio signal via an antenna 916. The radio communication interface 912 may also be a one-chip module integrating the BB processor 913 and the RF circuit 914. The radio communication interface 912 may also include multiple BB processors 913 and multiple RF circuits 914 as illustrated in FIG. 25. Note that although FIG. 25 illustrates an example of the radio communication interface 912 including multiple BB processors 913 and multiple RF circuits 914, the radio communication interface 912 may also include a single BB processor 913 or a single RF circuit 914.

Furthermore, in addition to a cellular communication scheme, the radio communication interface 912 may also support other types of radio communication schemes such as a short-range wireless communication scheme, a near field wireless communication scheme, or a wireless local area network (LAN) scheme. In this case, a BB processor 913 and an RF circuit 914 may be included for each radio communication scheme.

Each antenna switch 915 switches the destination of an antenna 916 among multiple circuits included in the radio communication interface 912 (for example, circuits for different radio communication schemes).

Each antenna 916 includes a single or multiple antenna elements (for example, multiple antenna elements constituting a MIMO antenna), and is used by the radio communication interface 912 to transmit and receive radio signals. The smartphone 900 may also include multiple antennas 916 as illustrated in FIG. 25. Note that although FIG. 25 illustrates an example of the smartphone 900 including multiple antennas 916, the smartphone 900 may also include a single antenna 916.

Furthermore, the smartphone 900 may also be equipped with an antenna 916 for each radio communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies electric power to the respective blocks of the smartphone 900 illustrated in FIG. 25 via power supply lines partially illustrated with dashed lines in the drawing. The auxiliary controller 919 causes minimal functions of the smartphone 900 to operate while in a sleep mode, for example.

In the smartphone 900 illustrated in FIG. 25, the information acquisition unit 261 and the communication control unit 263 described with reference to FIG. 5 may be implemented in the radio communication interface 912. Also, at least some of these functions may also be implemented in the processor 901 or the auxiliary controller 919.

(Second Application)

Figure 26:
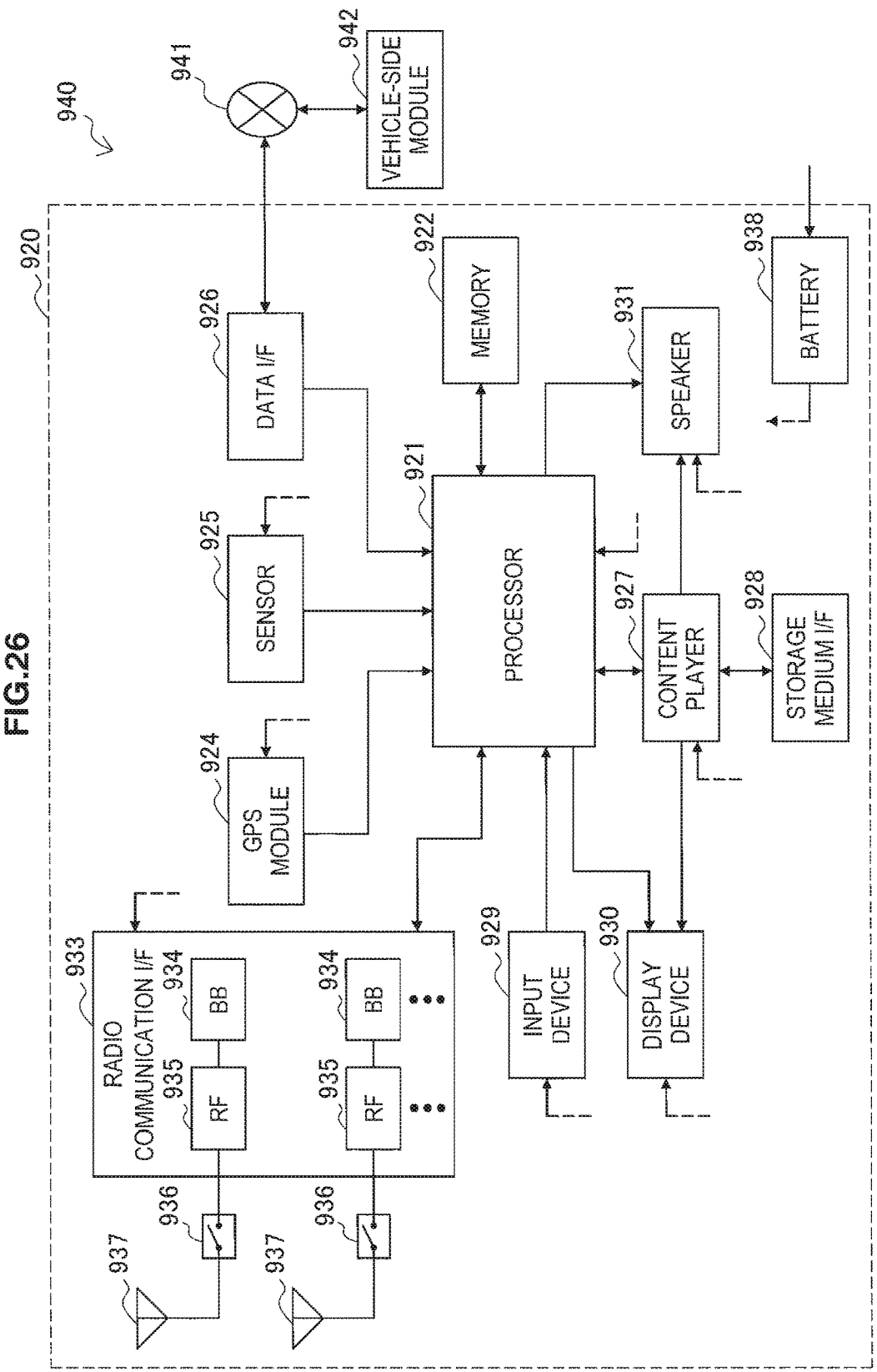
FIG. 26 is a block diagram illustrating an example of a schematic configuration of a car navigation device to which technology according to an embodiment of the present disclosure may be applied.

FIG. 26 is a block diagram illustrating an example of a schematic configuration of a car navigation device 920 to which technology according to an embodiment of the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The radio communication interface 933 supports a cellular communication scheme such as LTE or LTE-Advanced, and executes radio communication. Typically, the radio communication interface 933 may include a BB processor 934, an RF circuit 935, and the like. The BB processor 934 may conduct processes such as encoding/decoding, modulation/demodulation, and multiplexing/demultiplexing, for example, and executes various signal processing for radio communication. Meanwhile, the RF circuit 935 may include components such as a mixer, a filter, and an amp, and transmits or receives a radio signal via an antenna 937. The radio communication interface 933 may also be a one-chip module integrating the BB processor 934 and the RF circuit 935. The radio communication interface 933 may also include multiple BB processors 934 and multiple RF circuits 935 as illustrated in FIG. 26. Note that although FIG. 26 illustrates an example of the radio communication interface 933 including multiple BB processors 934 and multiple RF circuits 935, the radio communication interface 933 may also include a single BB processor 934 or a single RF circuit 935.

Furthermore, in addition to a cellular communication scheme, the radio communication interface 933 may also support other types of radio communication schemes such as a short-range wireless communication scheme, a near field wireless communication scheme, or a wireless LAN scheme. In this case, a BB processor 934 and an RF circuit 935 may be included for each radio communication scheme.

Each antenna switch 936 switches the destination of an antenna 937 among multiple circuits included in the radio communication interface 933 (for example, circuits for different radio communication schemes).

Each antenna 937 includes a single or multiple antenna elements (for example, multiple antenna elements constituting a MIMO antenna), and is used by the radio communication interface 933 to transmit and receive radio signals. The car navigation device 920 may also include multiple antennas 937 as illustrated in FIG. 28. Note that although FIG. 26 illustrates an example of the car navigation device 920 including multiple antennas 937, the car navigation device 920 may also include a single antenna 937.

Furthermore, the car navigation device 920 may also be equipped with an antenna 937 for each radio communication scheme. In this case, the antenna switch 936 may be omitted from the configuration of the car navigation device 920.

The battery 938 supplies electric power to the respective blocks of the car navigation device 920 illustrated in FIG. 26 via power supply lines partially illustrated with dashed lines in the drawing. Also, the battery 938 stores electric power supplied from the vehicle.

In the car navigation device 920 illustrated in FIG. 26, the information acquisition unit 261 and the communication control unit 263 described with reference to FIG. 5 may be implemented in the radio communication interface 933. Also, at least some of these functions may also be implemented in the processor 921.

In addition, technology according to the present disclosure may also be realized as an in-vehicle system (or vehicle) 940 that includes one or more blocks of the car navigation device 920 discussed above, the in-vehicle network 941, and a vehicle-side module 942. The vehicle-side module 942 generates vehicle-side data such as the vehicle speed, number of engine revolutions, or malfunction information, and outputs the generated data to the in-vehicle network 941.

<<6. Conclusion>>

The foregoing thus describes respective communication devices and respective processes according to an embodiment of the present disclosure with reference to FIGS. 2 to 26.

According to an embodiment according to the present disclosure, in the terminal device 200, the information acquisition unit 261, the information acquisition unit 261 acquires radio frame information indicating a radio frame for transmitting a discovery signal, and the communication control unit 263 controls the transmission of a discovery signal on the basis of the radio frame information. Also, in the terminal device 200, the information acquisition unit 261 acquires radio frame information indicating a radio frame for transmitting a discovery signal, and the communication control unit 263 controls a detection process for detecting a discovery signal on the basis of the radio frame information. As another example, in the base station 100, the information acquisition unit 151 acquires radio frame information indicating a radio frame for transmitting a discovery signal. Additionally, the communication control unit 153 controls the transmission of the radio frame information to the terminal device 200.

Consequently, it becomes possible to moderate the load on a terminal device 200 conducting D2D communication, for example.

Specifically, for example, with respect to a signal transmitted in a radio frame for transmitting a discovery signal, the terminal device 200 may conduct a detection process for detecting a discovery signal, and rapidly and reliably detect the discovery signal, for example. For this reason, the terminal device 200 may also not conduct the above detection process on a signal transmitted in a radio frame other than the above radio frame. In other words, the terminal device 200 does not have to conduct the above detection process at a high frequency of repetition in order to detect the discovery signal rapidly and reliably. Consequently, the load imposed by the discovery signal detection process may be moderated.

As another example, the terminal device 200 may transmit a discovery signal in a radio frame for transmitting a discovery signal, and not transmit a discovery signal in a radio frame other than the radio frame. In other words, the terminal device 200 does not have to transmit the discovery signal at a high frequency of repetition so that the discovery signal will be detected rapidly and reliably by another terminal device 200. Consequently, the load imposed by the transmission of the discovery signal may be moderated.

First Modification

In the first modification, the radio frame information indicates multiple radio frames for transmitting a discovery signal, and each of the multiple radio frames corresponds to any one meaning from among two or more meanings. Also, in the terminal device 200, the communication control unit 263 controls the transmission of a discovery signal so that the discovery signal is transmitted in a radio frame corresponding to a meaning to be reported from among the multiple radio frames. Also, in the terminal device 200, the communication control unit 263, upon detecting a discovery signal, identifies the meaning corresponding to the radio frame in which the detected discovery signal was transmitted from among the multiple radio frames.

Consequently, for example, by only transmitting and receiving a discovery signal, it becomes possible for the terminal device 200 on the receiving side to identify a meaning to be reported by the terminal device 200 on the transmitting side. For this reason, the rapid conveyance of meaning becomes possible. More specifically, for example, in D2D communication, when data indicating a meaning is transmitted and received after a connection is established through multiple transactions, the time taken to convey the meaning becomes long. On the other hand, when a discovery signal is transmitted and received in a radio frame corresponding to a meaning, the time taken to convey the meaning becomes short. For this reason, conveyance of the meaning becomes rapid. Note that when the purpose of D2D communication is for public safety, the urgency is high, and thus such rapid conveyance of meaning is particularly effective.

Second Modification

In the second modification, in the terminal device 200, the communication control unit 263 controls the transmission of a discovery signal so that the discovery signal is transmitted at a frequency of repetition depending on the purpose of D2D communication. Also, in the terminal device 200, the communication control unit 263 controls the detection process so that the detection process is conducted at a frequency of repetition depending on the purpose of D2D communication.

Consequently, for example, it becomes possible to moderate power consumption for discovery, while still satisfying the demand on the time required for discovery.

Specifically, for example, the time demand required for discovery may differ depending on the purpose of the D2D communication (such as collision warning, fire alert, and burglar alarm, for example). As an example, when the purpose of the D2D communication is a collision warning, the time required for discovery is demanded to be within a first time, whereas when the purpose of the D2D communication is a fire alert, the time required for discovery is demanded to be within a second time that is longer than the first time. In such cases, if the frequency of repetition of the discovery signal is stipulated so that the time required for discovery is within the first time, for example, when a terminal device conducts D2D communication for a fire alert but does not conduct D2D communication for a collision warning, the terminal device will transmit or detect a discovery signal at a higher frequency of repetition than is required. As a result, power may be wasted in the transmission or detection of a discovery signal. On the other hand, if the frequency of repetition of the discovery signal is stipulated so that the time required for discovery is within the second time, for example, when a terminal device conducts D2D communication for a collision warning, the terminal device will transmit or detect a discovery signal at an insufficient frequency of repetition. As a result, the demand on the time required for discovery is not satisfied. Accordingly, by transmitting a discovery signal and conducting the detection process at a frequency of repetition that depends on the purpose, it becomes possible to moderate power consumption for discovery, while still satisfying the demand on the time required for discovery.

Third Modification

In the third modification, in the terminal device 200, the communication control unit 263 controls the transmission of information to be reported so that the information to be reported is transmitted in a predetermined radio resource after the transmission of a discovery signal. Also, in the terminal device 200, the communication control unit 263, after the detection of a discovery signal, acquires information received in a predetermined radio resource for transmitting information to be reported after the transmission of a discovery signal. As another example, in the base station 100, the information acquisition unit 151 acquires radio resource information indicating a predetermined radio resource for transmitting information to be reported after the transmission of a discovery signal, and the communication control unit 153 controls the transmission of the radio resource information to the terminal device 200.

Consequently, for example, it becomes possible to rapidly convey detailed information.

Specifically, for example, when a radio frame corresponds to one meaning, like in the first modification, rapid conveyance of the meaning through transmission and reception of a discovery signal becomes possible, but the conveyance of detailed information is difficult. Also, if detailed information is transmitted and received after a connection is established through multiple transactions, the time taken to convey the detailed information becomes long. Accordingly, by transmitting and receiving information to be reported in a predetermined radio resource after a discovery signal, it becomes possible to convey detailed information rapidly.

Note that in cases such as when the purpose of D2D communication is data offloading, a large amount of data is transmitted and received by D2D communication, and thus the establishment of a connection is effective. However, when the purpose of D2D communication is public safety, the urgency is often high, and thus the technique according to the third modification is effective.

Fourth Modification

Individual Transmission Information and Aggregate Transmission Information

In the fourth modification, in the base station 100, for example, if individual transmission information related to radio frames for transmitting a discovery signal by a terminal device 200 is transmitted by each of one or more terminal devices 200 positioned within an area, the information acquisition unit 151 acquires the individual transmission information. Subsequently, the communication control unit 153 controls the transmission of aggregate transmission information related to radio frames for transmitting a discovery signal by the one or more terminal devices 200.

Also, in the terminal device 200, the information acquisition unit 261 acquires individual transmission information related to radio frames for transmitting a discovery signal by the terminal device 200, and the communication control unit 263 controls the transmission of the individual transmission information to the base station 100. Also, in the terminal device 200, the information acquisition unit 261 acquires aggregate transmission information related to radio frames for transmitting a discovery signal by one or more terminal devices 200 positioned within an area, and the communication control unit 263 controls the detection process on the basis of the aggregate transmission information.

Consequently, for example, when a terminal device 200 positioned within an area conducts the detection process for detecting a discovery signal, it becomes possible to conduct the detection process in the necessary and sufficient radio frames. For this reason, it becomes possible to moderate the load on the terminal device 200.

Specifically, for example, when none of the terminal devices 200 positioned within an area is transmitting a discovery signal for a collision warning, conducting the detection process in a radio frame for transmitting a discovery signal for a collision warning is wasteful for a terminal device 200 conducting the detection process within that area. Accordingly, by transmitting the aggregate transmission information to the terminal device 200, the terminal device 200 becomes able to identify the necessary and sufficient radio frames in which the detection process is conducted. For this reason, the load on the terminal device 200 may be moderated.

Individual Detection Information and Aggregate Detection Information

Also, in the fourth modification, in the base station 100, for example, if individual detection information related to radio frames for conducting a detection process for detecting a discovery signal by a terminal device 200 is transmitted by each of one or more terminal devices 200 positioned within an area, the information acquisition unit 151 acquires the individual detection information. Subsequently, the communication control unit 153 controls the transmission of aggregate detection information related to radio frames for conducting the detection process by the one or more terminal devices 200.

Also, in the terminal device 200, the information acquisition unit 261 acquires individual detection information related to radio frames for conducting the detection process by the terminal device 200, and the communication control unit 263 controls the transmission of the individual detection information to the base station 100. Also, in the terminal device 200, the information acquisition unit 261 acquires aggregate detection information related to radio frames for conducting a detection process for detecting a discovery signal by one or more terminal devices 200 positioned within an area, and the communication control unit 263 controls the transmission of a discovery signal on the basis of the aggregate detection information.

Consequently, for example, when a terminal device 200 positioned within an area transmits a discovery signal, it becomes possible to transmit the discovery signal in the necessary and sufficient radio frames. For this reason, it becomes possible to moderate the load on the terminal device 200.

Specifically, for example, when none of the terminal devices 200 positioned within an area is detecting a discovery signal for a collision warning, transmitting a discovery signal in a radio frame for transmitting a discovery signal for a collision warning is wasteful for a terminal device 200 transmitting a discovery signal within that area. Accordingly, by transmitting the aggregate detection information to the terminal device 200, the terminal device 200 becomes able to identify the necessary and sufficient radio frames in which a discovery signal is transmitted. For this reason, the load on the terminal device 200 may be moderated.

Fifth Modification

In the fifth modification, in the terminal device 200, the communication control unit 263 controls a detection process for detecting a discovery signal so that when the mode of the terminal device 200 is a connected mode, the detection process is conducted at a first frequency of repetition, whereas when the mode of the terminal device 200 is an idle mode, the detection process is conducted at a second frequency of repetition lower than the first frequency of repetition.

Consequently, it becomes possible to moderate the load on a terminal device 200 in idle mode, for example. Specifically, for example, in idle mode, the frequency of repetition of the detection process by the terminal device 200 becomes lower, making it possible to moderate power consumption in the terminal device 200.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, although an example is described in which the communication system is a system conforming to LTE, LTE-Advanced, or a compliant communication scheme, the present disclosure is not limited to such an example. For example, the communication system may be a system conforming to another communication standard.

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

In addition, it is possible to create a computer program for causing hardware such as a CPU, ROM, and RAM built into a communication control device (for example, a device included in a base station) or a terminal device to exhibit functions similar to each structural element of the foregoing communication control device or terminal device. Also, a storage medium having such a computer program stored therein may also be provided. Also, an information processing device (for example, a processing circuit or chip) equipped with memory storing such a computer program (for example, ROM and RAM) and one or more processors capable of executing such a computer program (such as a CPU or DSP, for example) may also be provided.

In addition, the advantageous effects described in this specification are merely for the sake of explanation or illustration, and are not limiting. In other words, instead of or in addition to the above advantageous effects, technology according to the present disclosure may exhibit other advantageous effects that are clear to persons skilled in the art from the description of this specification.

Additionally, the present technology may also be configured as below.

(1)
A communication control device including:
an acquisition unit configured to acquire radio frame information indicating a radio frame, the radio frame being a unit time of cellular communication, for transmitting a discovery signal enabling another device to discover a device conducting device-to-device communication; and
a control unit configured to control transmission of the radio frame information to a terminal device.

(2)
The communication control device according to (1), wherein the radio frame information indicates a system frame number of the radio frame.

(3)
The communication control device according to (1), or (2) wherein
the radio frame information indicates a plurality of radio frames for transmitting the discovery signal, and
each of the plurality of radio frames corresponds to any one meaning from among two or more meanings.

(4)
The communication control device according to (3), wherein
the radio frame information additionally indicates which meaning from among the two or more meanings each of the plurality of radio frames corresponds to.

(5)
The communication control device according to any one of (1) to 4, wherein the radio frame information indicates, for each purpose of device-to-device communication, a plurality of radio frames for transmitting the discovery signal at a frequency of repetition depending on the purpose.

(6)
The communication control device according to (5), wherein the radio frame information indicates, for each purpose of device-to-device communication, a cycle of transmission of the discovery signal depending on the purpose.

(7)
The communication control device according to any one of (1) to (6), wherein
the acquisition unit acquires radio resource information indicating a predetermined radio resource for transmitting information to be reported after transmission of the discovery signal, and
the control unit controls transmission of the radio resource information to a terminal device.

(8)
The communication control device according to (7), wherein the discovery signal includes a signal sequence common among terminal devices, and
the radio resource information indicates predetermined radio resources for transmitting the information to be reported after transmission of the discovery signal.

(9)
The communication control device according to any one of (1) to (8), wherein
when individual transmission information related to a radio frame for transmitting the discovery signal by a terminal device is transmitted by each of one or more terminal devices positioned within an area, the acquisition unit acquires the individual transmission information, and
the control unit controls transmission of aggregate transmission information related to a radio frame for transmitting the discovery signal by the one or more terminal devices.

(10)
The communication control device according to (9), wherein
the individual transmission information is information indicating a purpose of device-to-device communication for a terminal device, or is information indicating a cycle of transmission of the discovery signal by a terminal device.

(11)
The communication control device according to any one of (1) to (10), wherein
when individual detection information related to a radio frame for conducting a detection process for detecting the discovery signal by a terminal device is transmitted by each of one or more terminal devices positioned within an area, the acquisition unit acquires the individual detection information, and
the control unit controls transmission of aggregate detection information related to a radio frame for conducting the detection process by the one or more terminal devices.

(12)
The communication control device according to (11), wherein
the individual detection information is information indicating a purpose of device-to-device communication for a terminal device, or is information indicating a cycle of the detection process by a terminal device.

(13)
A communication control method including:
acquiring radio frame information indicating a radio frame, the radio frame being a unit time of cellular communication, for transmitting a discovery signal enabling another device to discover a device conducting device-to-device communication; and
controlling, with a processor, transmission of the radio frame information to a terminal device.

(14)
A terminal device including:
an acquisition unit configured to acquire radio frame information indicating a radio frame, the radio frame being a unit time of cellular communication, for transmitting a discovery signal enabling another device to discover a device conducting device-to-device communication; and a control unit configured to control transmission of the discovery signal based on the radio frame information.

(15)

The terminal device according to (14), wherein the radio frame information indicates a plurality of radio frames for transmitting the discovery signal, each of the plurality of radio frames corresponds to any one meaning from among two or more meanings, and the control unit controls transmission of the discovery signal so that the discovery signal is transmitted in a radio frame corresponding to a meaning to be reported from among the plurality of radio frames.

(16)

The terminal device according to (14) or (15), wherein the control unit controls transmission of the discovery signal so that the discovery signal is transmitted at a frequency of repetition depending on a purpose of device-to-device communication.

(17)

The terminal device according to (16), wherein the control unit controls transmission of the discovery signal so that the discovery signal is transmitted on a cycle depending on a purpose of device-to-device communication.

(18)

The terminal device according to any one of (14) to (17), wherein the control unit controls transmission of information to be reported so that the information to be reported is transmitted in a predetermined radio resource after transmission of the discovery signal.

(19)

The terminal device according to (18), wherein the discovery signal includes a signal sequence common among terminal devices, and the control unit controls transmission of the information to be reported so that the information to be reported is transmitted in one radio resource from among predetermined radio resources after transmission of the discovery signal.

(20)

The terminal device according to (19), wherein the control unit controls transmission of the information to be reported so that every time the discovery signal is transmitted, a radio resource in which the information to be reported is transmitted changes from one radio resource among the predetermined radio resources to another radio resource among the predetermined radio resources.

(21)

The terminal device according to any one of (14) to (20), wherein the acquisition unit acquires individual transmission information related to a radio frame for transmitting the discovery signal by the terminal device, and the control unit controls transmission of the individual transmission information to a base station.

(22)

The terminal device according to any one of (14) to (21), wherein the acquisition unit acquires aggregate detection information related to a radio frame for conducting a detection process for detecting the discovery signal by one or more terminal devices positioned within an area, and the control unit controls transmission of the discovery signal based on the aggregate detection information.

(23)

The terminal device according to any one of (14) to (22), wherein the control unit controls transmission of system information including a system frame number.

(24)

An information processing device including:

memory configured to store a program; and one or more processors able to execute the program, wherein the program causes the execution of acquiring radio frame information indicating a radio frame, the radio frame being a unit time of cellular communication, for transmitting a discovery signal enabling another device to discover a device conducting device-to-device communication, and controlling transmission of the discovery signal based on the radio frame information.

(25)

A terminal device including:

an acquisition unit configured to acquire radio frame information indicating a radio frame, the radio frame being a unit time of cellular communication, for transmitting a discovery signal enabling another device to discover a device conducting device-to-device communication; and a control unit configured to control a detection process for detecting the discovery signal based on the radio frame information.

(26)

The terminal device according to (25), wherein the radio frame information indicates a plurality of radio frames for transmitting the discovery signal, each of the plurality of radio frames corresponds to any one meaning from among two or more meanings, and when the discovery signal is detected, the control unit identifies a meaning corresponding to a radio frame in which the detected discovery signal was transmitted from among the plurality of radio frames.

(27)

The terminal device according to (25) or (26), wherein the control unit controls the detection process so that the detection process is conducted at a frequency of repetition depending on a purpose of device-to-device communication.

(28)

The terminal device according to (27), wherein the control unit controls the detection process so that the detection process is conducted on a cycle depending on a purpose of device-to-device communication.

(29)

The terminal device according to any one of (25) to (28), wherein the control unit, after detection of the discovery signal, acquires information received in a predetermined radio resource for transmitting information to be reported after transmission of the discovery signal.

(30)

The terminal device according to (29), wherein the control unit, after detection of the discovery signal, acquires information received in each of predetermined radio resources for transmitting the information to be reported after transmission of the discovery signal.

(31)

The terminal device according to any one of (25) to (30), wherein the acquisition unit acquires aggregate transmission information related to a radio frame for transmitting the discovery signal by one or more terminal devices positioned within an area, and the control unit controls the detection process based on the aggregate transmission information.

(32) The terminal device according to any one of (25) to (31), wherein
the acquisition unit acquires individual detection information related to a radio frame for conducting the detection process by the terminal device, and
the control unit controls transmission of the individual detection information to a base station.

(33) The terminal device according to any one of (25) to (32), wherein
the control unit controls the detection process so that the detection process is conducted at a first frequency of repetition when a mode of the terminal device is a connected mode, and the detection process is conducted at a second frequency of repetition lower than the first frequency of repetition when the mode of the terminal device is an idle mode.

(34) The terminal device according to any one of (25) to (33), wherein
the control unit controls transmission of system information including a system frame number.

(35) An information processing device including:
memory configured to store a program; and
one or more processors able to execute the program, wherein
the program causes the execution of
acquiring radio frame information indicating a radio frame, the radio frame being a unit time of cellular communication, for transmitting a discovery signal enabling another device to discover a device conducting device-to-device communication, and
controlling a detection process for detecting the discovery signal based on the radio frame information.

REFERENCE SIGNS LIST 1 communication system
100 base station
151 information acquisition unit
153 communication control unit
200 terminal device
261 information acquisition unit
263 communication control unit

The invention claimed is:
1. A communication control device comprising:
at least one processing circuit configured to
acquire radio resource information indicating a radio resource, the radio resource being a radio resource of cellular communication and having a periodicity, the radio resource information including transmission information for transmitting a discovery signal enabling a terminal device to discover at least another device conducting device-to-device communication, and detection information for conducting a detection process for detecting the discovery signal,
control transmission of the radio resource information to the terminal device,
receive, from the terminal device, individual detection information indicating which radio frame to use to conduct the detection process for detecting the discovery signal,
receive, from the terminal device, individual transmission information indicating which radio frame to use to transmit the discovery signal,
form aggregate detection information from information aggregated from the individual detection information from the terminal device and other individual detection information from the at least another terminal device,
form aggregate transmission information from information aggregated from the individual transmission information from the terminal device and other individual transmission information from the at least another terminal device, and
transmit, to the terminal device and the at least another terminal device, aggregate resource information, the aggregate resource information being usable by one or more terminal devices for communicating the discovery signal, the aggregate resource information including the aggregate transmission information and the aggregate detection information.

2. The communication control device according to claim 1, wherein
the radio resource information includes information for identifying a system frame number of the radio resource.

3. The communication control device according to claim 2, wherein
the information for identifying a system frame number of the radio resource indicates a cycle of the system frame number of the radio resource.

4. The communication control device according to claim 1, wherein
the radio resource information indicates a plurality of radio resources for transmitting the discovery signal, the plurality of radio resources having different cycles.

5. The communication control device according to claim 4, wherein
each of the plurality of radio resources corresponds to any one meaning from among two or more meanings.

6. The communication control device according to claim 5, wherein
the radio resource information additionally indicates which meaning among the two or more meanings each of the plurality of radio resources corresponds to.

7. The communication control device according to claim 1, wherein
the radio resource information indicates, for each purpose of device-to-device communication, a radio resource for transmitting the discovery signal at a frequency of repetition rate depending on the purpose.

8. The communication control device according to claim 7, wherein
the radio resource information indicates, for each purpose of device-to-device communication, a cycle of transmission of the discovery signal depending on the purpose.

9. A communication control method comprising:
acquiring radio resource information indicating a radio resource, the radio resource being a radio resource of cellular communication and having a periodicity, the radio resource information including transmission information for transmitting a discovery signal enabling a terminal device to discover at least another device conducting device-to-device communication, and detection information for conducting a detection process for detecting the discovery signal;

controlling, with a processor, transmission of the radio resource information to the terminal device;

receiving, from the terminal device, individual detection information indicating which radio frame to use to conduct the detection process for detecting the discovery signal;

receiving, from the terminal device, individual transmission information indicating which radio frame to use to transmit the discovery signal;

forming aggregate detection information from information aggregated from the individual detection information from the terminal device and other individual detection information from the at least another terminal device;

forming aggregate transmission information from information aggregated from the individual transmission information from the terminal device and other individual transmission information from the at least another terminal device, and transmitting, to the terminal device and the at least another terminal device, aggregate resource information, the aggregate resource information being usable by one or more terminal devices for communicating the discovery signal, the aggregate resource information including aggregate transmission information and aggregate detection information.

10. The communication control method according to claim 9, wherein
the radio resource information includes information for identifying a system frame number of the radio resource.

11. The communication control method according to claim 10, wherein
the information for identifying a system frame number of the radio resource indicates a cycle of the system frame number of the radio resource.

12. The communication control method according to claim 9, wherein
the radio resource information indicates a plurality of radio resources for transmitting the discovery signal, the plurality of radio resources having different cycles.

13. A terminal device comprising:
at least one processing circuit configured to
acquire radio resource information indicating a radio resource, the radio resource being a radio resource of cellular communication and having a periodicity, the radio resource information including transmission information for transmitting a discovery signal enabling a terminal device to discover at least another device conducting device-to-device communication, and detection information for conducting a detection process for detecting the discovery signal,
control transmission of the discovery signal based on the radio resource information,
transmit, to a base station, individual detection information indicating which radio frame to use to conduct the detection process for detecting the discovery signal,
transmit, to the base station, individual transmission information indicating which radio frame to use to transmit the discovery signal,
receive aggregate resource information from the base station, the aggregate resource information being usable by one or more terminal devices for communicating the discovery signal, the aggregate resource information including aggregate transmission information and aggregate detection information, the aggregate detection information being formed at the base station from information aggregated from the individual detection information from the terminal device and other individual detection information from the at least another terminal device, and the aggregate transmission information being formed at the base station from information aggregated from the individual transmission information from the terminal device and other individual transmission information from the at least another terminal device, and transmit the discovery signal in the radio frame to conduct detection.

14. The terminal device according to claim 13, wherein
the radio resource information includes information for identifying a system frame number of the radio resource.

15. The terminal device according to claim 14, wherein
the information for identifying a system frame number of the radio resource indicates a cycle of the system frame number of the radio resource.

16. The terminal device according to claim 15, wherein
the radio resource information indicates a plurality of radio resources for transmitting the discovery signal, the plurality of radio resources having different cycles.

17. The terminal device according to claim 16, wherein
the at least one processing circuit is further configured to control transmission of the discovery signal so that the discovery signal is transmitted on a set cycle.

18. A non-transitory computer-readable medium encoded with instructions, that when executed by at least one processor, cause the processor to perform a method, the method comprising:
acquiring radio resource information indicating a radio resource, the radio resource being a radio resource of cellular communication and having a periodicity, the radio resource information including transmission information for transmitting a discovery signal enabling a terminal device to discover at least another device conducting device-to-device communication, and detection information for conducting a detection process for detecting the discovery signal;
controlling transmission of the discovery signal based on the radio resource information;
transmitting, to a base station, individual detection information indicating which radio frame to use to conduct the detection process for detecting the discovery signal;
transmitting, to the base station, individual transmission information indicating which radio frame to use to transmit the discovery signal;
receiving aggregate resource information from the base station, the aggregate resource information being usable by one or more terminal devices for communicating the discovery signal, the aggregate resource information including aggregate transmission information and aggregate detection information, the aggregate detection information being formed at the base station from information aggregated from the individual detection information from the terminal device and other individual detection information from the at least another terminal device, and the aggregate transmission information being formed at the base station from information aggregated from the individual transmission information from the terminal device and other individual transmission information from the at least another terminal device, and transmitting the discovery signal in the radio frame to conduct detection.

19. A terminal device comprising:
at least one processing circuit configured to
acquire radio resource information indicating a radio resource, the radio resource being a radio resource of cellular communication and having a periodicity, the radio resource information including transmission information for transmitting a discovery signal enabling a terminal device to discover at least another device conducting device-to-device communication, and detection information for conducting a detection process for detecting the discovery signal,
control a detection process for detecting the discovery signal based on the radio resource information,
transmit, to a base station, individual detection information indicating which radio frame to use to conduct the detection process for detecting the discovery signal,
transmit, to the base station, individual transmission information indicating which radio frame to use to transmit the discovery signal,
receive aggregate resource information from the base station, the aggregate resource information being usable by one or more terminal devices for communicating the discovery signal, the aggregate resource information including aggregate transmission information and aggregate detection information, the aggregate detection information being formed at the base station from information aggregated from the individual detection information from the terminal device and other individual detection information from the at least another terminal device, and the aggregate transmission information being formed at the base station from information aggregated from the individual transmission information from the terminal device and other individual transmission information from the at least another terminal device, and
transmit the discovery signal in the radio frame to conduct detection.

20. A non-transitory computer-readable medium encoded with instructions, that when executed by at least one processor, cause the processor to perform a method, the method comprising:
acquiring radio resource information indicating a radio resource, the radio resource being a radio resource of cellular communication and having a periodicity, the radio resource information including transmission information for transmitting a discovery signal enabling a terminal device to discover at least another device conducting device-to-device communication, and detection information for conducting a detection process for detecting the discovery signal;
controlling a detection process for detecting the discovery signal based on the radio resource information;
transmitting, to a base station, individual detection information indicating which radio frame to use to conduct the detection process for detecting the discovery signal;
transmitting, to the base station, individual transmission information indicating which radio frame to use to transmit the discovery signal;
receiving aggregate resource information from the base station, the aggregate resource information being usable by one or more terminal devices for communicating the discovery signal, the aggregate resource information including aggregate transmission information and aggregate detection information, the aggregate detection information being formed at the base station from information aggregated from the individual detection information from the terminal device and other individual detection information from the at least another terminal device, and the aggregate transmission information being formed at the base station from information aggregated from the individual transmission information from the terminal device and other individual transmission information from the at least another terminal device, and
transmitting the discovery signal in the radio frame to conduct detection.

* * * * *